United States Patent [19]
Tanaka

[11] Patent Number: 6,097,796
[45] Date of Patent: Aug. 1, 2000

[54] COMMUNICATIONS TERMINAL APPARATUS CAPABLE OF DETECTING WIDE RANGE OF BUSY TONES THROUGH TELEPHONE LINE

[75] Inventor: Shigetaka Tanaka, Atsugi, Japan

[73] Assignee: Ricoh Company, Ltd., Tokyo, Japan

[21] Appl. No.: 09/047,234

[22] Filed: Mar. 25, 1998

[30] Foreign Application Priority Data

Mar. 26, 1997 [JP] Japan .................................... 9-090030

[51] Int. Cl.[7] .................................................. H04M 11/00
[52] U.S. Cl. ...................................... 379/100.06; 379/386
[58] Field of Search ...................... 379/100.01, 100.06, 379/100.14, 100.15, 100.16, 386, 257

[56] References Cited

U.S. PATENT DOCUMENTS

| | | | |
|---|---|---|---|
| 5,101,428 | 3/1992 | Koue | 379/100.14 |
| 5,479,501 | 12/1995 | Lai | 379/386 |
| 5,483,593 | 1/1996 | Gupta et al. | 379/386 |
| 5,642,406 | 6/1997 | Gahang | 379/386 |

*Primary Examiner*—Stella Woo
*Attorney, Agent, or Firm*—Cooper & Dunham LLP

[57] ABSTRACT

A communications terminal apparatus capable of detecting a busy tone by measuring time periods of a periodic tone state and off-tone state is provided. The apparatus includes a data transmitter and receiver, memory for storing first and second reference time ranges, first and second timers for measuring tone and off-tone state time periods of a signal on a telephone line, respectively, and a busy tone detector. The busy detector detects a busy tone by determining whether the measured tone and off-tone state time periods are within the first and second reference time ranges, respectively, and determining whether the signal alternately includes the measured tone and off-tone time periods.

9 Claims, 17 Drawing Sheets

COMMUNICATIONS TERMINAL APPARATUS CAPABLE OF DETECTING WIDE RANGE OF BUSY TONES THROUGH TELEPHONE LINE

BACKGROUND

1. Field of the Invention

The present application relates to a communications terminal apparatus, and more particularly to a communications terminal apparatus that is capable of detecting various busy tones including ones out of standards.

2. Discussion of the Related Art

Communications terminal apparatuses, such as facsimile apparatuses, personal computers, and so forth, are required to have a function for detecting a busy tone to disconnect a telephone line. Specifically, when a facsimile apparatus, for example, initiates an automatic call to a destination facsimile apparatus which is then in busy status, a busy tone signal is transmitted by a telephone switching system, i.e. a private branch exchange (PBX), to which the initiating facsimile apparatus is coupled through a subscriber's line. The busy tone signal is transmitted to the initiating facsimile apparatus through a subscriber's line and contains a waveform having two alternate states which are a busy tone and off-tone states. Since the signal produces a tone in a busy tone state and no tone in an off-tone state, repeating the two states produce an intermittent buzzer, which is referred to as a busy tone, for informing a communications terminal apparatus and a user that a destination apparatus is in busy state.

When the initiating facsimile apparatus detects a busy tone, the telephone line which is then connected is preferred to be immediately disconnected, so that the subscriber's line is free to receive an incoming call and, accordingly, an improvement can be made on efficiency of telephone line engagement.

As another example, a telephone in an automatic answering and recording operation mode is needed to immediately disconnect a telephone line in a case that a calling party releases the line after completing his transmission of voice messages to the telephone. In this case, a busy tone may mistakenly be recorded as a noisy sound after the voice massages if the telephone does not disconnect the line relatively soon after the calling party finishes transmission of voice messages. The line disconnection at the telephone side can be performed with an assistance of a function for detecting a predetermined time period for an off-tone after the calling party finishes voice message transmission or for detecting a busy tone transmitted from a telephone switching system which detects a disconnection at the calling party side and generates a busy tone to a subscriber's line coupled to the telephone. The above-mentioned type of telephone is often incorporated in communications terminal apparatuses such as facsimile apparatuses, personal computers having a communications function, and so forth.

In the above-mentioned facsimile apparatus, for example, which detects a busy tone to disconnect the line, the busy tone detecting function is needed to be performed in a precise manner.

Generally, a busy tone is generated by a telephone switching system, to which a communications apparatus is coupled, and transmitted to the communications apparatus through a subscriber's line. When all the telephone switching system generates a busy tone that has a common characteristic, a communications terminal apparatus is capable of detecting such a busy tone having a common characteristic regardless of types of telephone switching systems.

In Japan, for example, a telephone switching system is required to generate a busy tone signal that has a waveform illustrated in FIG. 13 as a signal A. Such a busy tone signal can be understood as a signal made by modulating a signal having a waveform of 400 Hz±19 Hz illustrated in FIG. 13 as a signal B with a modulation signal having an on and off ratio of 50%±10% and a cycle of 60 Hz±20% illustrated in FIG. 13 as a signal C. However, telephone switching systems practically generate a signal having the shape of signal A of FIG. 13 by switching the signal B of FIG. 13, on and off, at predetermined intervals. Therefore, a busy tone signal can be defined by several values such as switching cycles, on-time and off-time periods, and so forth. These values are referred to as cadence characteristics.

From the above, a busy tone can properly be detected by previously knowing several characteristics of an actual busy tone signal on a telephone line, such as a frequency, and tone and off-tone state time periods.

There are countries where facsimile apparatuses are required to include a function for detecting a busy tone in an automatic call initiation operation. In these countries, the facsimile apparatuses have parameters which correspond to characteristics of a busy tone so as to detect a busy tone according to the requirements. Further, in facsimile apparatuses having an automatic answering and recording function, it is possible to terminate a recording operation by detecting a busy tone using the parameters, when a calling party finishes transmission of voice messages.

Despite the above-mentioned requirements, telephone switching systems that are aged and therefore transmit a busy is tone signal out of standards are still in operation in some countries. In this case, the characteristics of busy tone varies between telephone switching systems. This causes problems in that parameters provided to facsimile apparatuses may not fit to the busy tone characteristics of the telephone switching systems in some cases. As a result, the facsimile apparatuses may fail to detect a busy tone and to disconnect the telephone line while the line of the counter party of communications is disconnected.

When failing in the busy tone detection, the problem may not result in a capital error because in the automatic answering and recording function the facsimile apparatuses normally has a function for automatically disconnecting the telephone line in a predetermined time period which safeguards an event of failure in busy tone detection. However, the busy tone detection failure may cause a serious problem during the automatic answering and recording operation. In this case, the facsimile apparatuses automatically record the busy tone as a noisy sound as long as the line is connected. This results in a waste of recording medium and a reduction of telephone line engagement efficiency.

Adjusting the parameters for a busy tone at each of the facsimile apparatuses by service personnel may require a considerable amount of work force and cost since most countries have a large number of facsimile apparatus installations.

This problem of a busy tone is not limited to the telephone switching systems that are for subscriber lines. In a case of the telephone switching systems that are for extension lines, a similar problem occurs.

The present problem is that there is no communications terminal apparatus capable of detecting various busy tones including ones out of standards.

SUMMARY

The present application provides a communications terminal apparatus that is capable of detecting various busy tones including those generated outside of current standards.

In one embodiment, the communications terminal apparatus includes a data transmitter and receiver, a memory for storing first and second reference time ranges, a first timer for measuring a tone state time period of a signal on a telephone line, a second timer for measuring an off-tone state time period of the signal, and a busy tone detector for detecting a busy tone by determining whether the measured tone and off-tone state time periods of the signal are within the first and second reference time ranges, respectively, and whether the signal alternately includes the measured tone and off-tone time periods, and determining as that the signal includes a busy tone when the measured tone and off-tone state time periods of the signal are within the first and second reference time ranges, respectively, and when the signal alternately includes the measured tone and off-tone time periods.

Other objects, features, and advantages of the present application will become apparent from the following detailed description when read in conjunction with the accompanying drawings.

This application is based on Japanese Patent application JPAP09-090030 filed in the Japanese Patent Office on Mar. 26, 1997, of which the entire contents are hereby incorporated by reference.

BRIEF DESCRIPTION OF THE DRAWINGS

A more complete appreciation of the present application and many of the attendant advantages thereof will be readily obtained as the same becomes better understood by reference to the following detailed description when considered in connection with the accompanying drawings, wherein.

DETAILED DESCRIPTION

Figure 1:
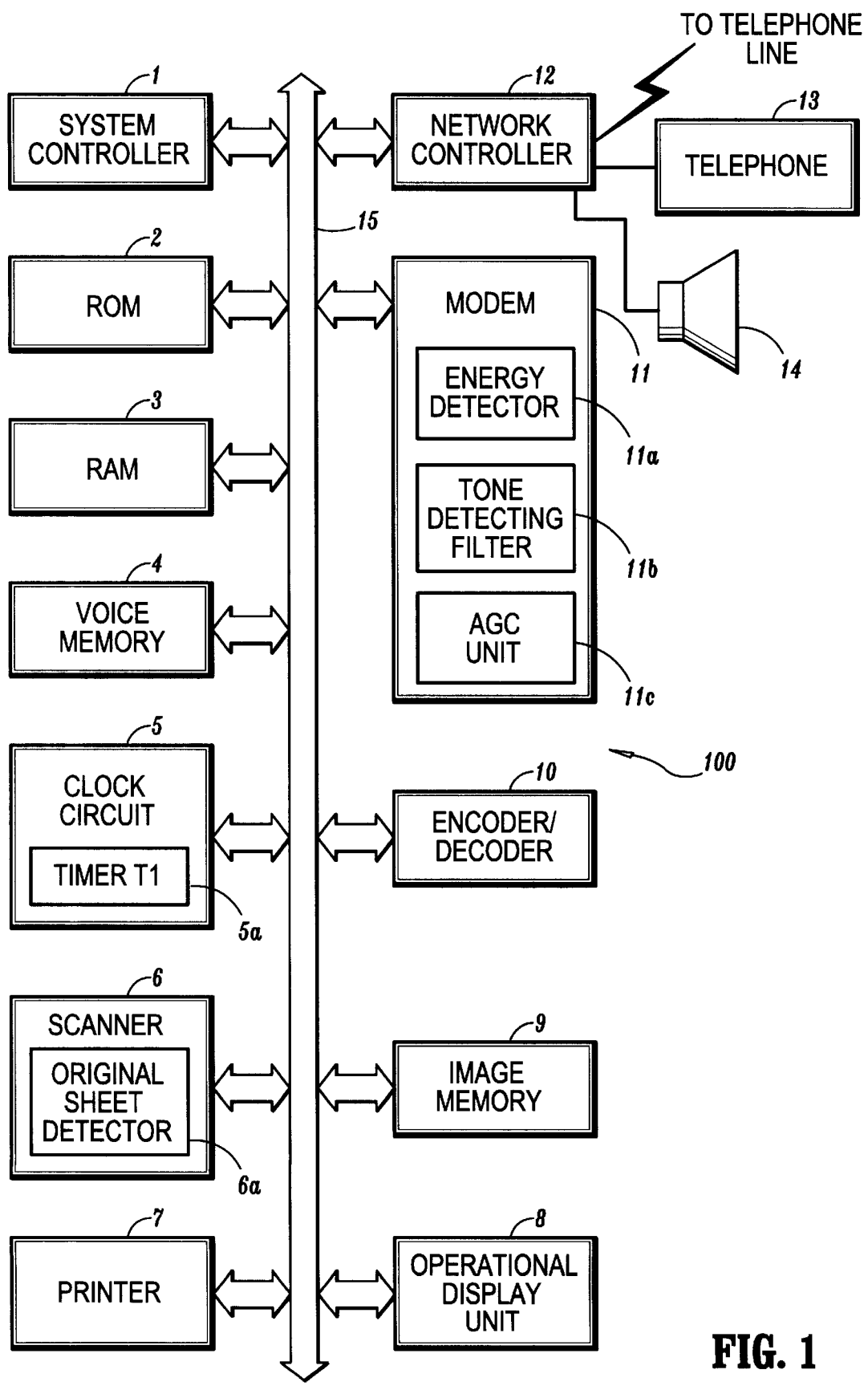
FIG. 1 is a block diagram of a facsimile apparatus according to the present application.

In describing preferred embodiments of the present application illustrated in the drawings, specific terminology is employed for the sake of clarity. However, the present application is not intended to be limited to the specific terminology so selected and it is to be understood that each specific element includes all technical equivalents which operate in a similar manner.

Referring now to the drawings, wherein like reference numerals designate identical or corresponding parts throughout the several views, and more particularly to FIG. 1 thereof, in which a block diagram of a facsimile apparatus 100 as an exemplary embodiment according to the present application is illustrated. The facsimile apparatus 100 has various functions including a group 3 facsimile transmission function, an automatic telephone answering and recording function, and so forth.

The facsimile apparatus 100 of FIG. 1 includes a system controller 1, a ROM (read only memory) 2, a RAM (random access memory) 3, a voice memory 4, a clock circuit 5, a scanner 6, and a printer 7. The facsimile apparatus 100 further includes an operational display unit 8, an image memory 9, an encoder/decoder 10, a modem 11, a network controller 12, a telephone 13, a speaker 14, and a system bus 15. The scanner 6 includes an original sheet detector 6a. The modem 11 includes an energy detector 11a, a tone detecting filter 11b, and an AGC (automatic gain control) unit 11c.

The system controller 1 is preferably a microcomputer which controls the entire apparatus. The ROM 2 is read by the system controller 1 and stores programs including a control program and various kinds of data used by the control program.

Figure 2:
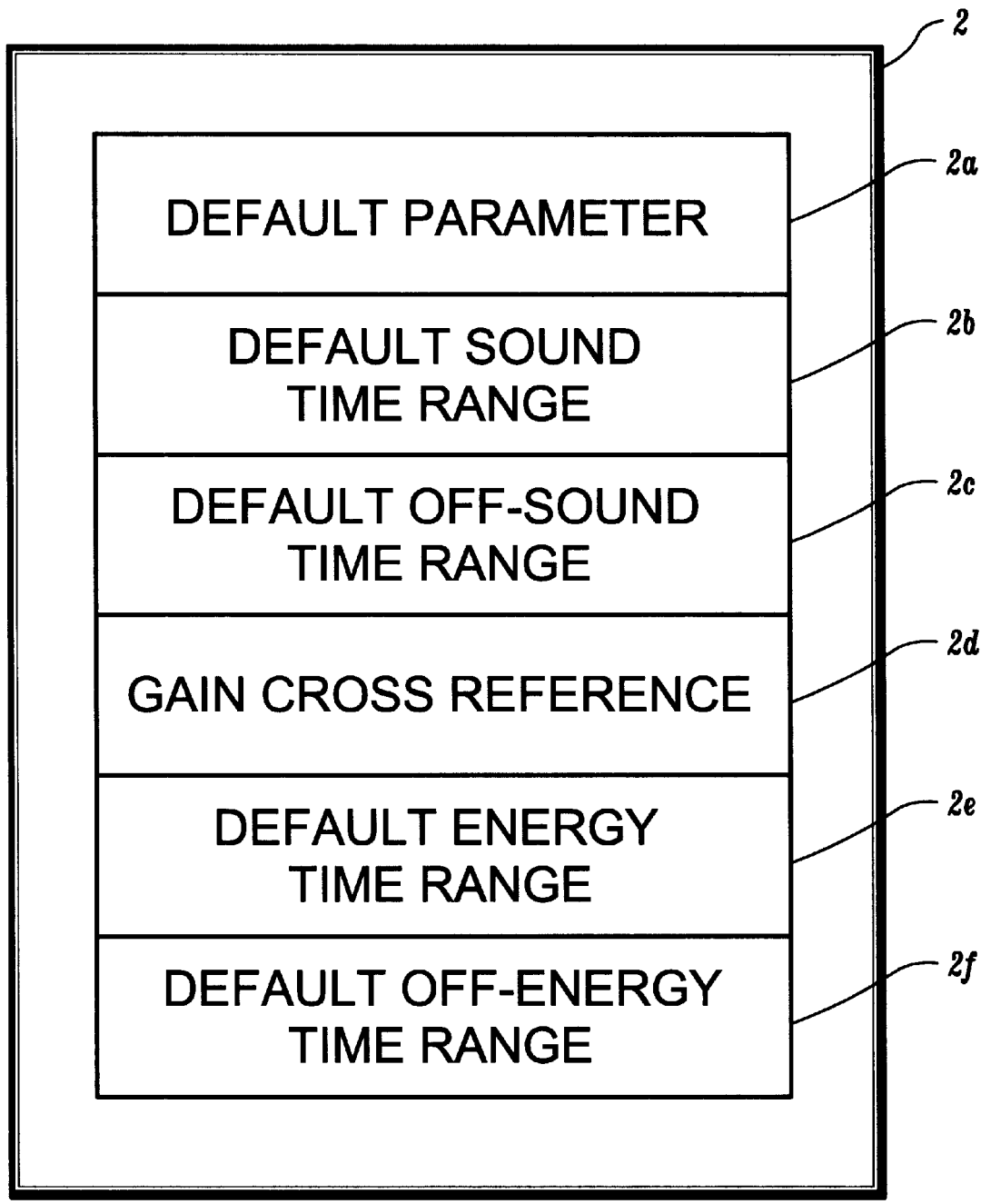
FIG. 2 is a block diagram illustrating various memory regions included in a ROM (read only memory) of the facsimile apparatus of FIG. 1.

Referring to FIG. 2, the ROM 2 includes various memory regions including a default parameter region 2a that stores predefined default parameters representing filtering characteristics of the tone detecting filter 11b (seen in FIG. 1), a default tone time range region 2b that stores a default effective range for a time period that a busy tone remains in a tone state, and a default off-tone time range region 2c that stores a default effective range for a time period that a busy tone remains in an off-tone state. The various memory regions included in the ROM 2 further includes a gain cross reference region 2d that stores data of a cross reference table for gains and signal levels with respect to an automatic gain control operation performed by the AGC unit 11c (seen in FIG. 1). A default energy time range region 2e stores a default effective range for a time period that a busy tone remains in an energy state, and a default off-energy time range region 2f stores a default effective range for a time period that a busy tone remains in an off-energy state.

Figure 3:
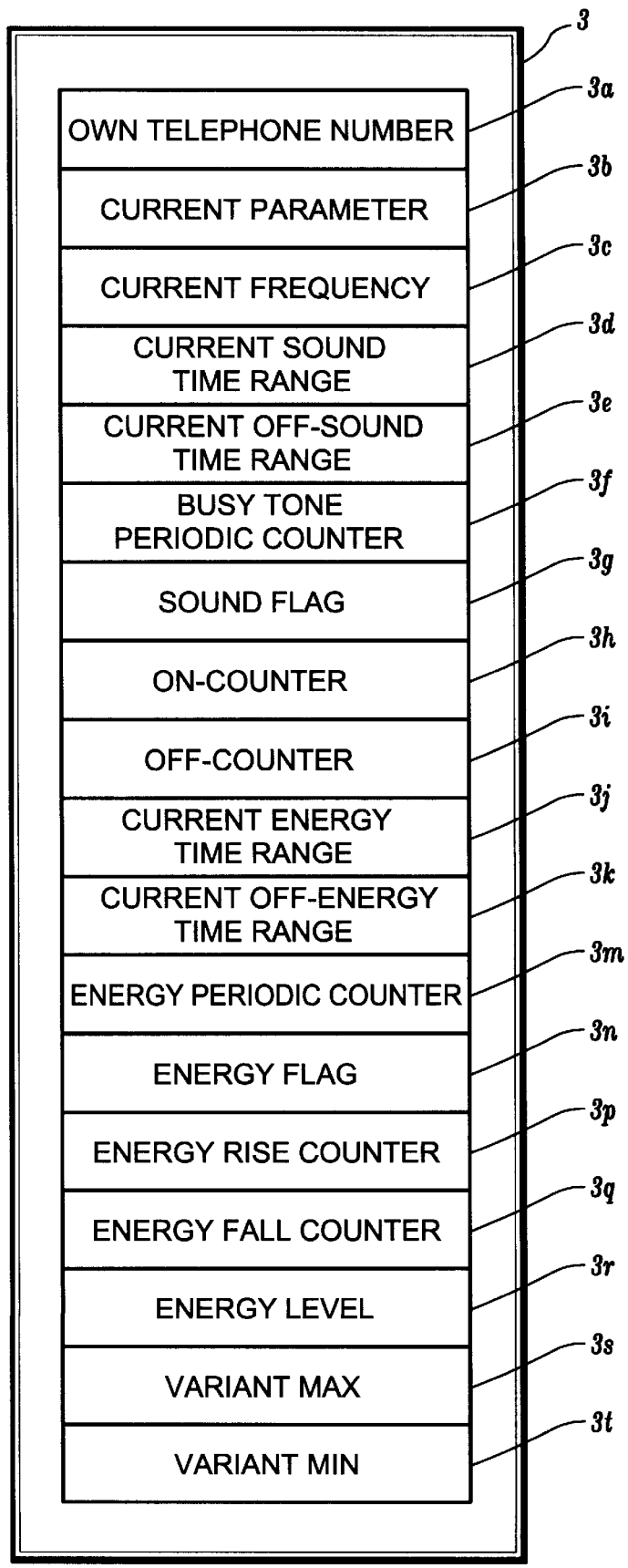
FIG. 3 is a block diagram illustrating various memory regions included in a RAM (random access memory) of the facsimile apparatus of FIG. 1.

Referring to FIG. 3, the RAM 3 functions as a working memory in which the system memory 1 temporarily stores data. The RAM 3 includes various memory regions including an own telephone number 3a, current parameter 3b, central frequency 3c, current tone time range 3d, current off-tone time 3e, busy tone periodic counter (Tb) 3f, tone flag (Fb) 3g, busy tone rise counter (Cb-on) 3h, and busy tone fall counter (Cb-off) 3i. The memory regions included in the RAM 3 further includes a current energy time range 3j, current off-energy time range 3k, energy periodic counter (Te) 3m, energy flag (Fe) 3n, energy rise counter (Ce-on) 3p, and energy fall counter (Ce-off) 3q.

The own telephone number region 3a stores a telephone number of the facsimile apparatus 100. The current parameter region 3b stores current parameters for filtering characteristics of the tone detecting filter 11b (seen in FIG. 1) when the default parameters stored in the default parameter region 2a are changed. The central frequency region 3c is included in the current parameter region 3b and stores a central frequency which is a variable parameter included in a plurality of parameters for the filtering characteristics of the tone detecting filter 11c.

The current tone time range region 3d stores a current effective range for a tone time period that a busy tone remains in a tone state when the corresponding default effective range stored in the default tone time range region 2b is changed to the current effective range. The current off-tone time range region 3e stores a current effective range for a time period that a busy tone remains in an off-tone state when the corresponding default effective range stored in the default off-tone time range region 2c is changed to the current affective range. The busy tone periodic counter region (Tb) 3f is used to count a number of tone and off-tone periods of a busy tone signal. The tone flag region (Fb) 3g indicates if a busy tone signal is in a tone state or an off-tone state. The busy tone rise counter (Cb-on) region 3h is used to count a number of rising times of a busy tone signal. The busy tone fall counter (Cb-off) region 3i is used to count a number of falling times of a busy tone signal.

The current energy time range region 3j stores a current effective range for a time period that a busy tone signal is not in an appropriate level of tone state but in a detectable energy state, when the corresponding default effective range stored in the default energy time range region 2e is changed to the current effective range. The current off-energy time range region 3k stores a current effective range for a time period that a busy tone remains in an off-energy state, when the corresponding default effective range stored in the default off-energy time range region 2f is changed to the current affective range. The energy periodic counter (Te) region 3m is used to count a number of energy and off-energy periods of a busy tone signal. The energy flag (Fe) region 3n indicates if a busy tone signal is in an energy state or an off-energy state. The energy rise counter (Ce-on) region 3p is used to count a number of rising time of a busy tone signal. The energy fall counter (Ce-off) region 3q is used to count a number of falling times of a busy tone signal.

Referring again to FIG. 1, the voice memory 4 stores data for answering messages for the automatic telephone answering and recording function, and stores voice messages received during the time when the automatic telephone answering and recording function is in operation. The voice memory 4 may be a RAM (random access memory), a cassette tape, or the like. Alternatively, a part of the image memory 9 may be used as the voice memory 4. The voice memory 4 and the RAM 3 are protected by a backup circuit (not shown) so as to retain the above-mentioned data in the event of a power failure.

The clock circuit 5 includes a plurality of timers for various functions including a time-of-day clock and a plurality of system clocks including a timer 5a for counting a time so as to send an interruption signal to the system controller 1 when the timer counts a present time (T1) or a time set by the system controller 1. The scanner 6 reads an original sheet to generate image data corresponding to an image of the original sheet at a predetermined resolution. For this operation, an original sheet detector 6a detects when an original sheet is placed on the scanner 6 and notifies the system controller 1 of the event.

The printer 7 produces an image output on a recording sheet in accordance with facsimile image data sent from a sending facsimile apparatus, as well as in accordance with image data generated by the scanner 6. The operational display unit 8 includes various keys that initiate predefined functions of the communication terminal apparatus. Examples of such keys and their corresponding functions include a ten-key pad for users to input a telephone number of a destination facsimile apparatus and to input a registered short-cut telephone number to call a destination facsimile apparatus which operation is referred to as a short-cut number dialing operation. A one-touch-call-key pad includes a plurality of one-touch-call keys wherein each key initiates a call to one of registered destination facsimile apparatuses. A start key is provided to start facsimile transmission, and an automatic mode key switches an operation mode to an automatic answering and recording operation mode. The operational display unit 8 further includes various indicators for indicating status of the system, guidance for operations, and so forth.

The image memory 9 temporarily stores facsimile image data sent from a sending facsimile apparatus and image data generated by the scanner 6. The encoder/decoder 10 compresses image data, using various encoding methods, including an MH (modified Huffman), an MR (modified read) and the like, to transmit to a destination facsimile apparatus and decompresses facsimile image data sent from a sending facsimile apparatus to reproduce image data substantially similar to original image data. The modem 11 performs a facsimile data transmission control in accordance with group 3 facsimile protocols. In the facsimile data transmission control, the modem 11 modulates image data and protocol signals so as to transmit them to the lines through the network controller 12 and demodulates modulated signals over the lines to reproduce image data and protocol signals which are substantially similar to original image data and protocol signals sent from a sending facsimile apparatus.

The network controller 12 performs various functions, for example; switching a line connection between the modem 11 and the telephone 13, generating dialing pulses and a dual tone multi-frequency (DTMF) signal, detecting a change of signal polarity of the telephone line, detecting a ringing of an incoming call, opening/closing a direct current loop of the telephone line, and detecting on/off status of a hand-set of the telephone 13. The network controller 12 further performs a function for connecting the loud speaker 14 to the telephone line or to the modem 11, so as to make it possible for users to hear the line signal of an incoming call as a tone or to listen to a playback of voice messages recorded during the automatic answering and recording operation mode.

The modem 11 includes a DSP (digital signal processor) (not shown) and A/D (analog-to-digital) and D/A (digital-to-analog) converters (not shown) and performs various functions, for example; a general G3 facsimile modem function including data modulation/demodulation, an automatic answering operation in which voice message data stored in the voice memory 4 are converted into an analog signal and the analog signal is transmitted to the telephone line through the network controller 12 during the automatic answering and recording operation mode, an automatic recording operation in which incoming voice messages are encoded and recorded in the voice memory 4 during the automatic answering and recording operation mode, and a playback operation in which the voice messages recorded in the voice memory 4 during the automatic answering and recording operation mode are decoded back to an analog signal and outputted to the loud speaker 14 through the network controller 12.

The energy detector 11a, known itself, detects an electric power on the telephone line so as to determine an incoming signal. The tone detecting filter 11b is a band-pass filter that includes predetermined parameters for filtering characteristics so as to detect frequencies of a tone signal on the telephone line. These parameters have default values which are previously stored in the default parameter 2a, seen in FIG. 2, and can be changed by the system controller 1. The AGC unit 11c automatically sets the gain of a front stage amplifier included in the A/D converter of the modem 11. The gain setting is based on a difference between an incoming signal level over the telephone line and a level of the A/D converter in which a level for receiving an incoming signal is normalized so as to maximize a signal conversion ability usable to the incoming signal over the telephone line. The gain set by the AGC unit 11c can be read by the system controller 1 on an as needed basis.

The above-mentioned elements communicate with each other through the system bus 15 in order to achieve various functions including, for example, general facsimile communications and the automatic answering and recording operation during the time that the automatic mode key of the operational display unit 8 is pressed.

Next, an exemplary procedure of a facsimile image transmission operation by the facsimile apparatus 100 is explained with reference to FIGS. 1 and 4. In this exemplary procedure, the facsimile apparatus 100 sends image information to a destination facsimile apparatus via a telephone switching system, e.g., a private branch exchange (PBX), through a facsimile image transmission operation of FIG. 4. In Step S101 of FIG. 4, the system controller 1 checks the status of the original sheet detector 6a to determine whether an original sheet is placed on the scanner 6. As Step S101 forms a NO loop, the system controller 1 keeps checking the status of the original sheet detector 6a until an original sheet is placed on the scanner 6. When an original sheet is placed on the scanner 6, the process proceeds to Step S102 and the system controller 1 checks if a telephone number of a destination facsimile apparatus is designated through the operational display unit 8 using, for example, the one-touch-call key or the short-cut number dialing operation. As Step S102 forms a NO loop, the system controller 1 keeps checking if a telephone number is designated. When a telephone number is designated and the check result of Step S102 is YES, the process proceeds to Step S103 and the system controller 1 checks if the start key is pressed. If the start key has not been pressed Step S103 forms a NO loop, and the system controller 1 keeps checking if the start key is pressed. When the start key is pressed and the check result of Step S103 is YES, the process proceeds to Step S104 and the system controller 1 instructs the network controller 12 to initiate a call to the destination facsimile apparatus that has the above-mentioned designated telephone number.

Then, system controller 1 instructs the clock circuit 5 to start the timer 5a in Step S105 and starts a busy tone detection process in Step S106, which will be explained later in detail. The system controller 1 checks if the network controller 12 receives an incoming signal responding to the initiating call in Step S107. If no incoming signal is received the busy tone periodic counter 3f is checked to see if Tb has a value equal to or greater than 4 in Step S109, and if Tb is less than 4 the timer 5a is checked to see if time T1 falls on time-out in Step S110.

When in step S107 the network controller 12 receives an incoming signal responding to the initiating call, the process proceeds to Step S108 and the system controller 1 starts the facsimile transmission procedure. After a completion of transmitting facsimile image data through the facsimile transmission procedure, the system controller 1 instructs the network controller 12 to disconnect the telephone line in Step S112, so that the process ends.

When in step S109 the value of the busy tone periodic counter (Tb) 3f becomes equal to or greater than 4, before the timer (T1) 5a falls on time-out, the check result of Step S109 is YES and the process proceeds to Step S111 in which the busy tone detection process is ended, and then the system controller 1 instructs the network controller 12 to disconnect the telephone line (step S112), so that the process ends.

When in step S110 the timer 5a falls on time-out, before a value of the busy tone periodic counter (Tb) 3f becomes equal to or greater than 4, the check result is YES and the process continues to Step S112 and the system controller 1 instructs the network controller 12 to disconnect the telephone line, so that the process ends. When in step 110 the timeout does not occur, the process returns to step 107 and the busy tone detection process is repeated.

The busy tone periodic counter 3f is a counter that is incremented or reset during a time of a timer interruption procedure for observing a busy tone on a busy tone signal. When a value of the busy tone signal is equal to 4, it means that the incoming signal is detected as a signal having two continuous and electrically stable cycles of tone time within an effective tone time range and an off-tone time within an effective off-tone time range and being in accordance with the default values of filtering characteristic parameters, tone time range, and off-tone time range stored in the respective memory regions of the ROM 2. That is, the facsimile apparatus 100 detects a busy tone signal transmitted from the telephone switching system, e.g., a private branch exchange (PBX), using the busy tone periodic counter 3f so as to swiftly disconnect the telephone line when the destination facsimile apparatus is busy and not able to send back a signal responding to the initiating call.

Figure 4:
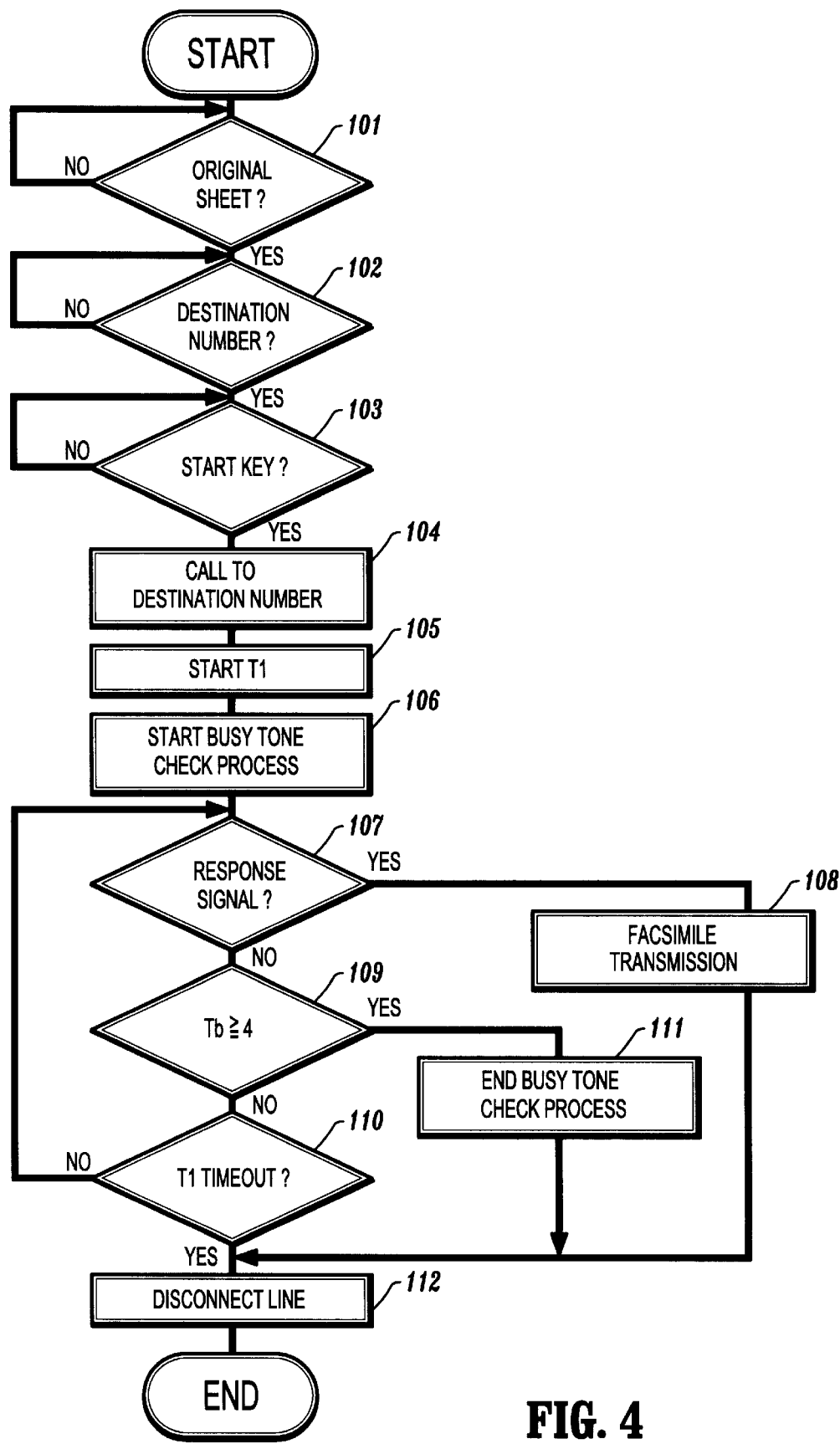
FIG. 4 is a flowchart for explaining an exemplary operation of facsimile transmission including a busy tone detection process.
Figure 5:
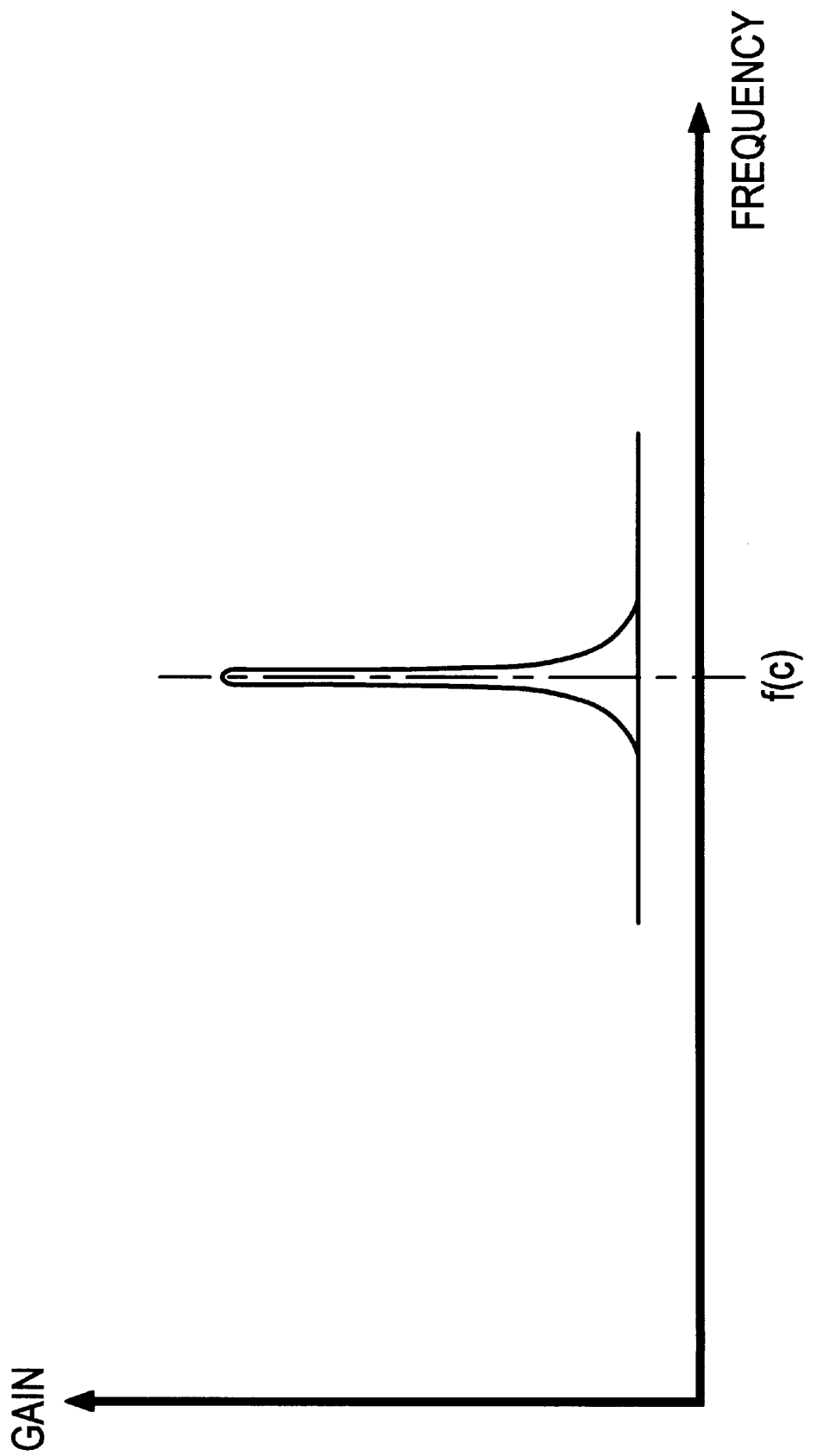
FIG. 5 is a graph illustrating a relationship of gain and frequency as a characteristic of an exemplary band-pass filter used in the facsimile apparatus of FIG. 1.

Next, an exemplary operation of the busy tone detection process performed in Step S106 of FIG. 4 is explained with reference to FIGS. 5–7(b). In the present application, a busy tone signal that is sent to the facsimile apparatus 100 through the subscriber telephone line is assumed to have an exemplary signal shape as illustrated in FIG. 5. In such a wave form of the busy tone signal, a state having amplitude is referred to as a tone state and a state having no amplitude is referred to as an off-tone state. The busy tone signal in a tone state has a frequency close to a central frequency f(c) of the tone detecting filtering characteristic, illustrated in FIG. 6, and which is inputted into the tone detecting filter 11b, so that the tone detecting filter 11b can detect the busy tone signal.

The busy tone detection process is a higher priority interruption process that is triggered by an interruption signal intermittently generated by the timer 5a provided to the clock circuit 5 of the facsimile apparatus 100. Each time when the timer 5a generates an interruption signal until the timer 5a falls on a time-out status, the system controller 1 is interrupted by the interruption signal and is forced to start the busy tone detection process at a higher priority, even if the system controller 1 is engaged in other processes. For the above-mentioned interruption operation, the timer 5a generates an interruption signal at predetermined intervals, e.g., 10 ms, which is sufficiently shorter than each time period for the tone and off-tone states of the busy tone signal. In addition, when the busy tone detection process is activated, various variants used therein are all initialized.

Figure 6:
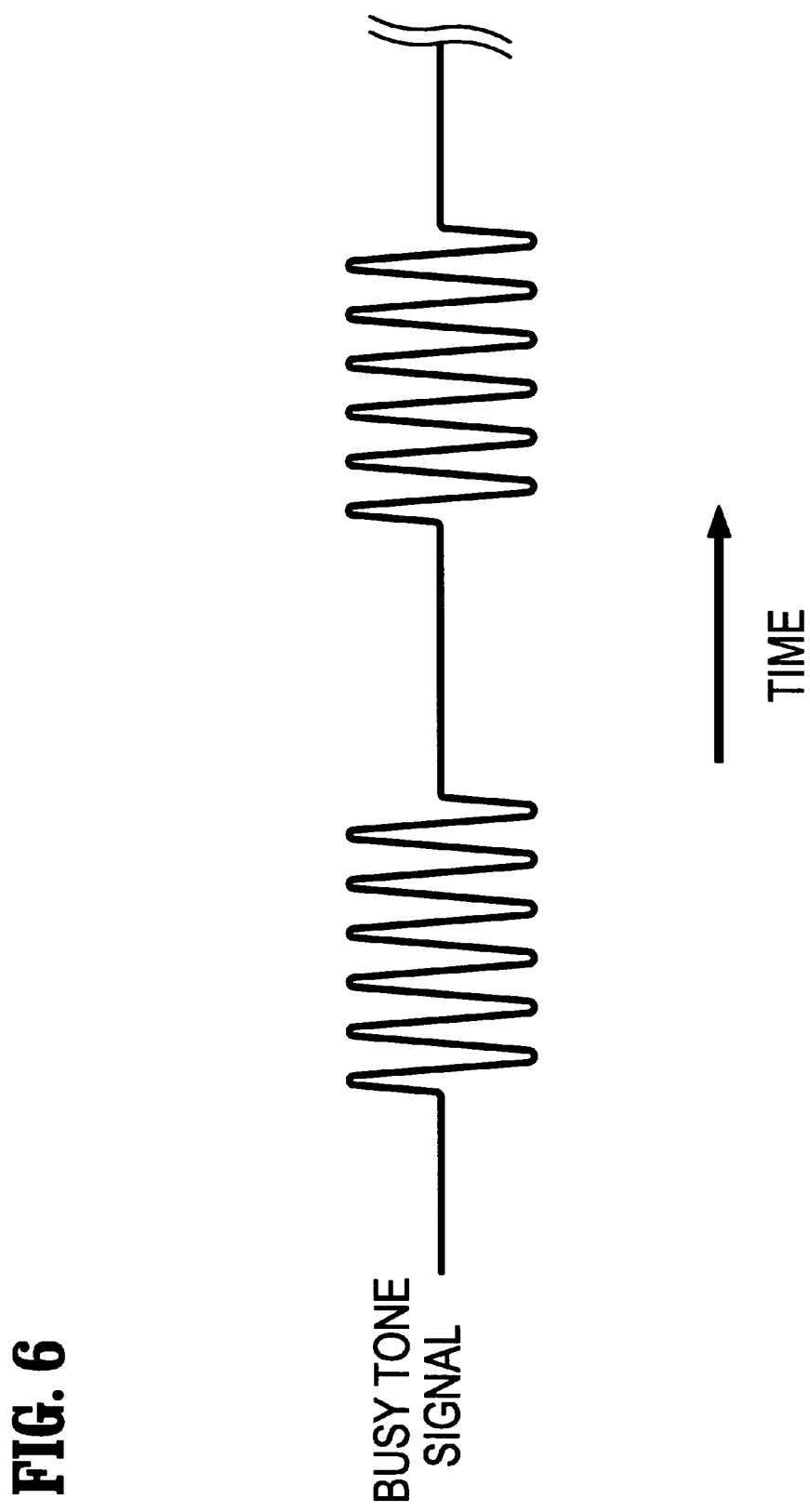
FIG. 6 is an exemplary waveform of a busy tone signal.
Figure 7A:
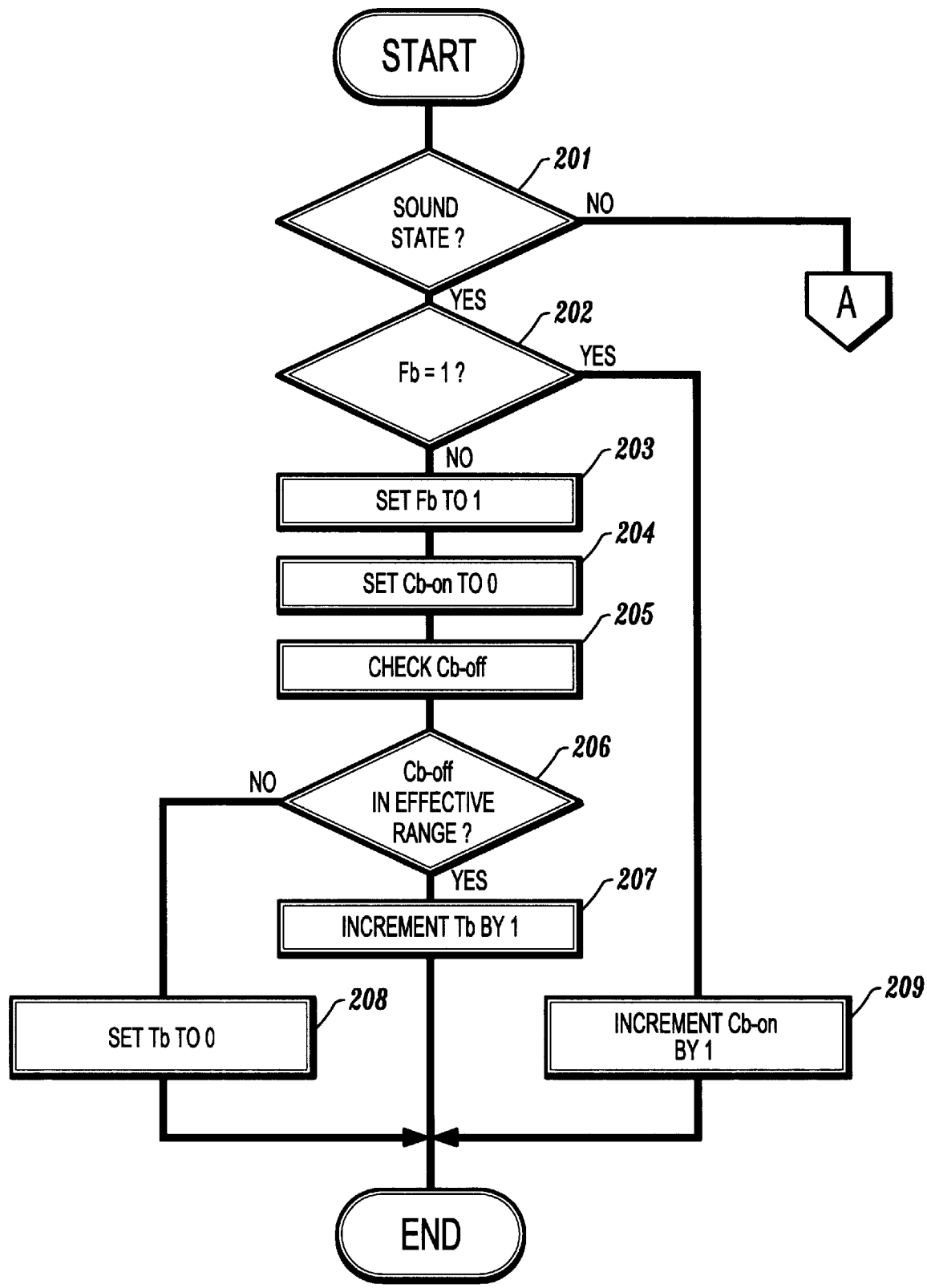
FIGS. 7(a) and 7(b) is a flowchart for explaining another exemplary operation of busy tone detection process.
Figure 7B:
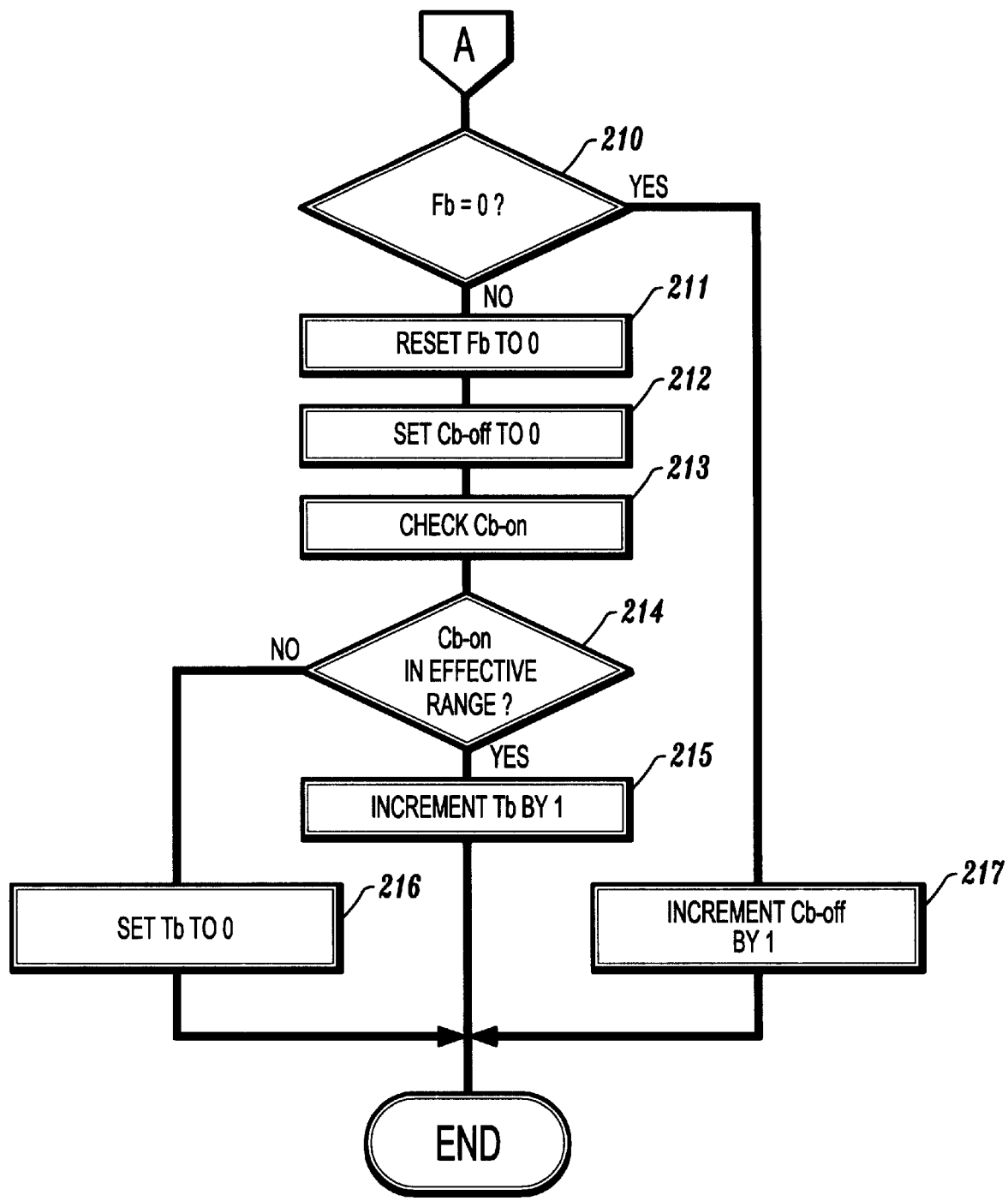

A flow of an exemplary operation of the busy tone detection process is indicated in FIGS. 7(a) and 7(b). Upon an occurrence of an interruption for the busy tone detection process, the system controller 1 starts the busy tone detection process and first examines an output signal from the tone detecting filter 11b to check if the output signal includes a busy tone in a tone state in Step S201. At this time, the tone detecting filter 11b is set to the default values of filtering characteristic parameters stored in the default parameter 2a, so that the tone detecting filter 11b has the characteristics of band-pass filter having a gain around the central frequency f(c) of, for example 400 Hz, as seen in FIG. 6.

When the tone detecting filter 11b outputs a signal having a busy tone in a tone state and the check result of Step S201 is YES, the system controller 1 then checks in Step S202 if the tone flag 3g value Fb is set at 1. When the tone flag 3g is not set at 1 and the check result of Step S202 is NO, the tone flag 3g value Fb is set to 1 in Step S203. Then, the system controller 1 sets the busy tone rise counter 3h value Cb-on to 0 in Step S204 and checks a value Cb-off of the busy tone fall counter 3i in Step S205. In Step S206, the system controller 1 determines whether the busy tone fall counter 3i value Cb-off is within the default range of the off-tone time period stored in the default off-tone time range 2c.

When the busy tone fall counter 3i value Cb-off is within the default range of the off-tone time period and the determination result of Step S206 is YES, the system controller 1 then increments the busy tone periodic counter 3f value Tb in Step S207, and the busy tone detection process ends. When the busy tone fall counter 3i value Cb-off is out of the default range of the off-tone time period and the determination result of Step S206 is NO, the system controller 1 then resets the busy tone periodic counter 3f value Tb to 0 in Step S208, and the busy tone detection process ends.

When in step S202 the tone flag 3g value Fb is set at 1 and the check result of Step S202 is YES, the system controller 1 increments the busy tone rise counter 3h value Cb-on in Step S209, and the busy tone detection process ends.

When the tone detecting filter 11b outputs a signal having a busy tone in an off-tone state and the check result of Step S201 is NO, the process proceeds to Step S210 of FIG. 7(b) and the system controller 1 checks if the tone flag 3g value Fb is set at 0. When the tone flag 3g value Fb is not 0 but 1 and the check result of Step S210 is NO, the system controller 1 then: 1) resets the tone flag 3g value Fb to 0 (Step S211); 2) sets the busy tone fall counter 3i value Cb-off to 0 (Step S212); and 3) checks the busy tone rise counter 3h value Cb-on (Step S213). In Step S214, the system controller 1 determines whether the value Cb-on of the busy tone rise counter 3h is within the default range of the tone time period stored in the default tone time range 2b.

If the busy tone rise counter 3h value Cb-on is within the default range of the tone time period and the determination result of Step S214 is YES, the system controller 1 then increments the busy tone periodic counter 3f value Tb in Step S215, and the busy tone detection process ends. If the busy tone rise counter 3h value Cb-on is out of the default range of the tone time period and the determination result of Step S214 is NO, the system controller 1 resets the busy tone periodic counter 3f value Tb to 0 in Step S216, and the busy tone detection process ends.

When in step S210 the tone flag 3g value Fb is set at 0 and the check result of Step S210 is YES, the system controller 1 increments the busy tone fall counter 3i value Cb-off in Step S217, and the busy tone detection process ends.

Further details of the various variants used in the busy tone detection process are explained below. The tone flag 3g value Fb changes from 0 to 1 when a busy tone signal changes from a tone state to an off-tone state, remaining at 1 during the tone state, and changing from 1 to 0 when the signal changes its state from tone to off-tone, and remaining at 0 during the off-tone state. The busy tone rise counter 3h value Cb-on is reset when the busy tone signal changes its state from off-tone to tone and is incremented by one each time the timer 5a generates an interruption signal during the time of the tone state. The busy tone fall counter 3i value Cb-off is reset to 0 when the busy tone signal changes its state from tone to off-tone and is incremented by one each time when the timer 5a generates an interruption signal during the time of the off-tone state. In this way, values stored in the busy tone rise counter 3h and busy tone fall counter 3i represent tone and off-tone time periods, respectively.

The busy tone rise counter 3h value (Cb-on) is checked each time when the state of the busy tone signal changes from tone to off-tone so as to read an immediately previous tone time period. If the busy tone rise counter 3h value Cb-on is within the corresponding effective time period, the busy tone periodic counter 3f is incremented, and if not, the busy tone periodic counter 3f is reset to 0. In a similar way, the busy tone fall counter 3i value Cb-off is checked each time when the state of the busy tone signal changes from off-tone to tone so as to read an immediately previous off-tone time period. If the busy tone fall counter 3i value Cb-off is within the corresponding effective time period, the busy tone periodic counter 3f is incremented, and if not, the busy tone periodic counter 3f is reset to 0.

In the above-described way, the facsimile apparatus 100 performs the busy tone detection process so as to execute a facsimile image transmission operation in a time efficient manner by avoiding a redundant waiting time when a destination facsimile apparatus is in a busy status.

Next, an exemplary automatic answering and recording operation of the facsimile apparatus 100 is explained with reference to FIG. 8. In responding to a call from a calling apparatus, the facsimile apparatus 100 performs an exemplary automatic answering and recording operation. In Step S301 the system controller 1 of the facsimile apparatus 100 performs an incoming call check that checks if there is an incoming call from a calling apparatus. When there is no incoming call, Step S301 forms a NO loop so that the incoming call check is continuously performed. When there is an incoming call and the check result of Step S301 is YES, the system controller 1 then performs a message transmission operation in Step S302. During the message transmission operation, the system controller 1 instructs the network controller 12 to connect the telephone line and transmits the response voice message data stored in the voice memory 4 to the modem 11, and the response voice message data are converted into analog voice data by the modem 11 and transmitted to the telephone line through the network controller 12. Then, the system controller 1 starts recording of an incoming voice message in Step S303, the busy tone detection process in Step S304, and an energy detection process in Step S305. The busy tone detection process in Step S304 is similar to that in Step S106 of FIG. 4 and the energy detection process in Step S305 is explained later.

Then, system controller 1 checks if the busy tone periodic counter 3f value Tb is equal to or greater than 4 in Step S306. If the counter value Tb is less than 4, the energy periodic counter 3m is checked to see if Te has a value equal to or greater than 8 in Step S307.

When the busy tone periodic counter 3f value Tb becomes equal to or greater than 4 or when a value Te of the energy periodic counter 3m is equal to or greater than 8, the process proceeds to Step S308 and the system controller 1 finishes the incoming voice message recording operation. Then, the system controller 1 instructs the network controller 12 to disconnect the telephone line in Step S309, so that the process ends. When the energy periodic counter 3m value Te is smaller than 8 in step S307, the process returns to Step S306 to continue checking the busy tone periodic counter 3f and energy periodic counter 3m.

The energy periodic counter 3m is a counter that is incremented or reset during the T1 interruption operation for observing an energy transmitted from the telephone switching system, e.g., a private branch exchange (PBX), associated with the facsimile apparatus 100. When a value Te of the energy periodic counter is equal to 8, it means that the incoming signal is detected as a signal having 4 continuous and electrically stable cycles of energy time within an effective energy time range and off-energy time within an effective off-energy time range and being in accordance with the default values of filtering characteristic parameters, energy time range, and off-energy time range stored in the respective memory regions of the ROM 2. That is, the facsimile apparatus 100 detects an energy using the energy periodic counter 3m, when the calling apparatus disconnects the telephone line after completing a message transmission and the telephone switching system, e.g., a private branch exchange (PBX), associated with the facsimile apparatus 100 transmits to the associated subscriber line a busy tone signal that is not in an appropriate level of tone state but in a detectable energy state.

In the way as described above, the facsimile apparatus 100 detects a busy tone signal that is not in an appropriate level of tone state but in a detectable energy state so as to swiftly disconnect the telephone line after the calling apparatus finishes a voice message transmission and disconnects the telephone line. Thereby, the facsimile apparatus 100 can perform the voice message recording operation without recording noisy busy tones.

Figure 8:
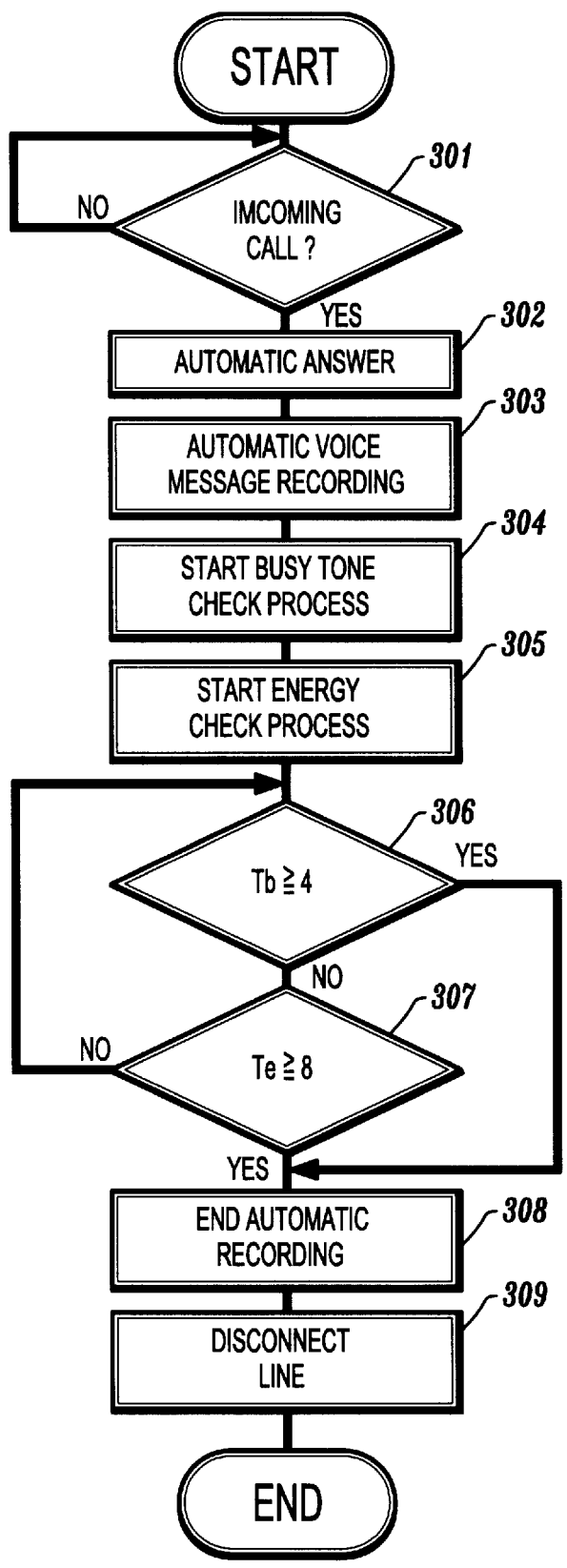
FIG. 8 is a flowchart for explaining an exemplary operation of automatic answering and recording mode function including busy tone and energy detection processes.

Next, an exemplary operation of the energy detection process performed in Step S305 of FIG. 8 is explained with reference to FIGS. 9(a) and 9(b). In the present application, a busy tone signal that is sent to the facsimile apparatus 100 through the subscriber telephone line is assumed to have an exemplary signal shape, as illustrated in FIG. 5. In such a wave form of the busy tone signal, states having amplitude is referred to as an energy state and states having no amplitude is referred to as an off-energy state. The energy detecting filter 11a is arranged to have predetermined energy detecting filtering characteristics in accordance with the values stored in the default parameter 2a so as to properly detect a busy tone signal that is intermittently in an energy state and in an off-energy state as described above.

The energy detection process is a higher priority interruption process that is triggered by an interruption signal intermittently generated by the timer (T1) 5a provided to the clock circuit 5 of the facsimile apparatus 100. Each time when the timer (T1) 5a generates an interruption signal until the timer (T1) 5a falls on a time-out status, the system controller 1 is interrupted by the interruption signal and is forced to start the energy detection process at a higher priority, even if the system controller 1 is engaged in other processes. For the above-mentioned interruption operation, the timer 5a generates an interruption signal at predetermined intervals, e.g. 10 ms, which is sufficiently shorter than each time period for the energy and off-energy states of a busy tone signal. In addition, when the energy detection process is activated, variants used therein are all initialized.

Figure 9A:
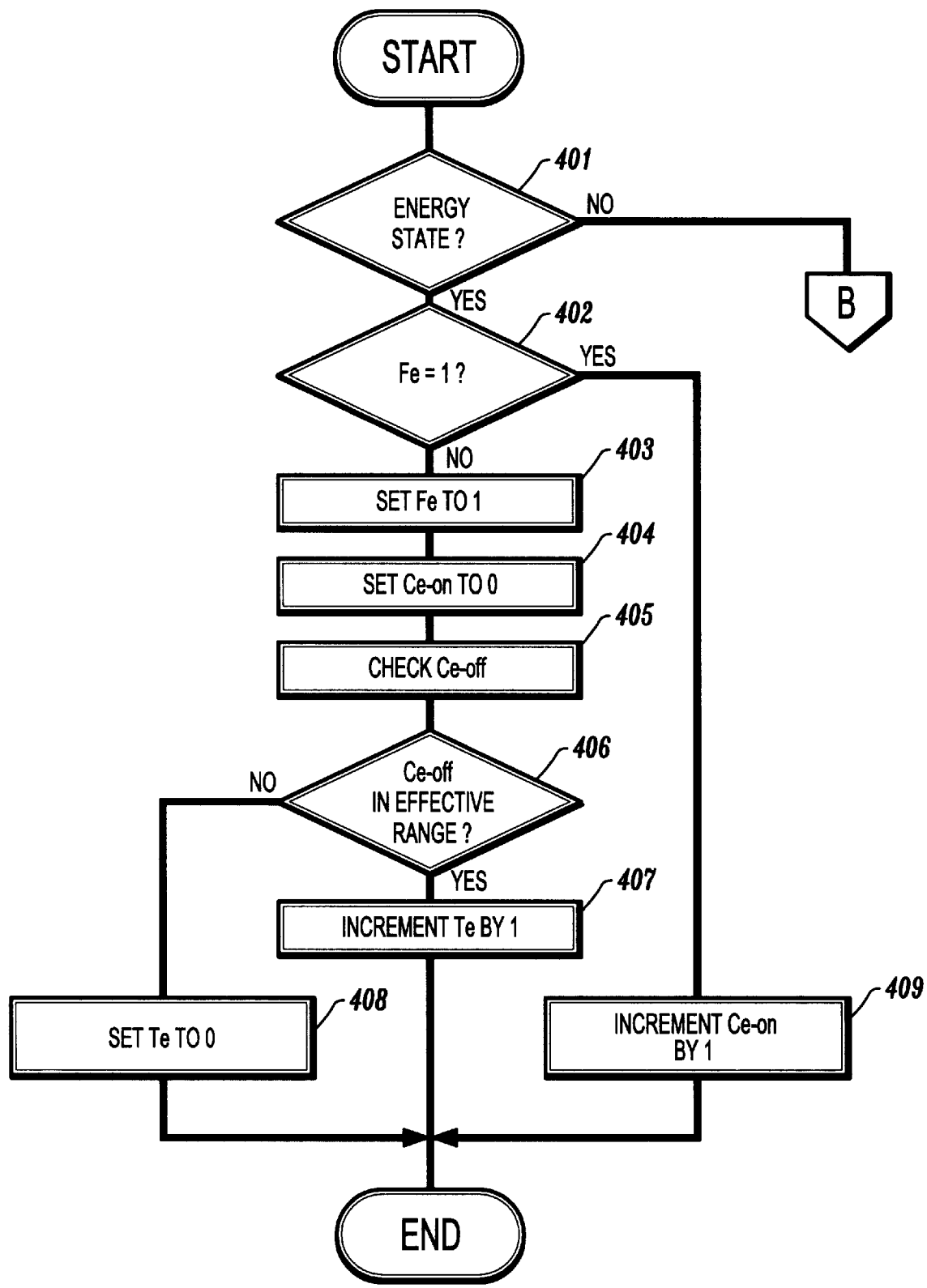
FIGS. 9(a) and 9(b) is a flowchart for explaining another exemplary energy detection process.
Figure 9B:
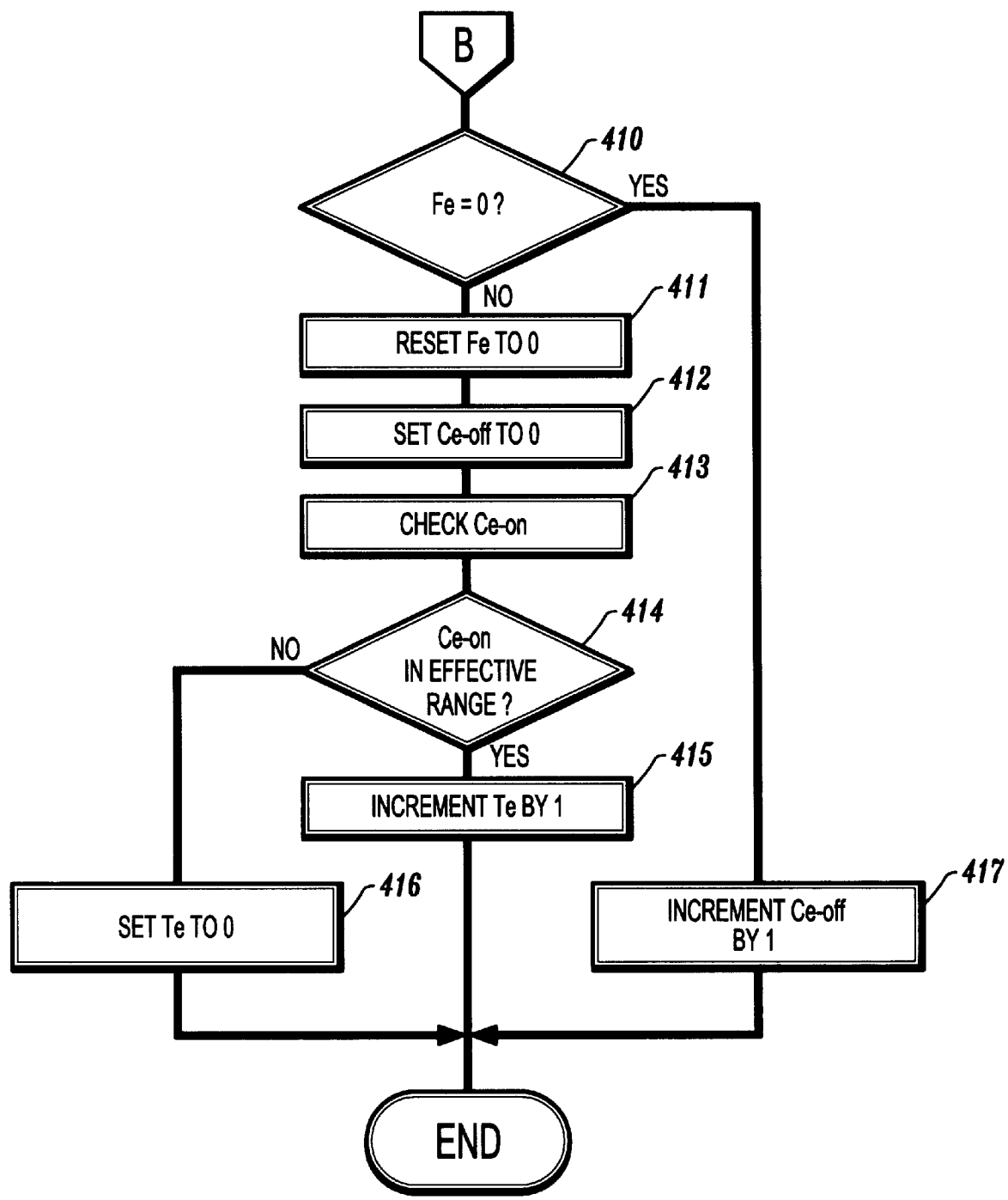

Upon an occurrence of an interruption for the energy detection process of FIGS. 9(a) and 9(b), the system controller 1 starts the energy detection process and first examines an output signal from the energy detecting filter 11a to check if the output signal is in an energy state or an off-energy state in Step S401 of FIG. 9(a). At this time, the energy detecting filter 11a provided to the modem 11 of the facsimile apparatus 100 is set to the default values of filtering characteristic parameters stored in the default parameter 2a.

When the energy detecting filter 11a outputs a signal in an energy state and the check result of Step S401 is YES, the system controller 1 then checks in Step S402 if the energy flag 3n value Fe is set at 1. When the energy flag 3n value Fe is not set at 1 and the check result of Step S402 is NO, the energy flag 3n value Fe is set to 1 in Step S403. Then, the system controller 1 sets the energy rise counter 3p value Ce-on to 0 in Step S404 and checks a value Ce-off of the energy fall counter (Ce-off) 3q in Step S405. In Step S406, the system controller 1 determines whether the value Ce-off of the energy fall counter 3q is within the default range of the off-energy time period that is stored in the default off-energy time range 2f.

When the energy fall counter 3q value Ce-off is within the default range of the off-energy time period and the determination result of Step S406 is YES, the system controller 1 then increments the energy periodic counter 3m value Te in Step S407. Then, the energy detection process ends. When the energy fall counter 3q value Ce-off is out of the default range of the off-energy time period and the determination result of Step S406 is NO, the system controller 1 then resets the energy periodic counter 3m so that the counter value Te is to 0 in Step S408. Then, the energy detection process ends.

When the energy flag 3n value Fe is set at 1 and the check result of Step S402 is YES, the system controller 1 increments the energy rise counter 3p in Step S409, and the energy detection process ends.

When the energy detecting filter 11a outputs a signal in an off-energy state and the check result of Step S401 is NO, the process proceeds to Step S410 of FIG. 9(b) and the system controller 1 checks if the energy flag 3n value Fe is set at 0. When the energy flag 3n value Fe is not 0 but 1 and the check result of Step S410 is NO, the system controller 1 resets the energy flag 3n value Fe to 0 in Step S411, sets the energy fall counter 3q value Ce-off to 0 in Step S412, and checks a value of the energy rise counter (Ce-on) 3p in Step S413. In Step S414, the system controller 1 determines whether the energy rise counter (Ce-on) 3p value is within the default range of the energy time period stored in the default energy time range 2e.

When the energy rise counter 3p value Ce-on is within the default range of the energy time period and the determination result of Step S414 is YES, the system controller 1 then increments the energy periodic counter 3m in Step S415, the energy detection process ends. When the energy rise counter 3p value Ce-on is outside the default range of the energy time period and the determination result of Step S414 is NO, the system controller 1 then reset the energy periodic counter 3m to 0 in Step S416. Then, the energy detection process ends.

When the energy flag 3n value is set at 0 and the check result of Step S410 is YES, the system controller 1 increments the energy fall counter 3q in Step S417, and the energy detection process ends.

Further details of the various variants used in the energy detection process are explained below. The energy flag 3n value Fe changes from 0 to 1 when the busy tone signal changes from an energy state to an off-energy state, remaining at 1 during the energy state, and changing from 1 to 0 when the signal changes its state from energy to off-energy, and remaining at 0 during the off-energy state. The energy rise counter 3p value Ce-on is reset when the busy tone signal changes its state from off-energy to energy and is incremented by one each time the timer 5a generates an interruption signal during the time of the energy state. The energy fall counter 3q value Ce-off is reset to 0 when the busy tone signal changes its state from energy to off-energy and is incremented by one each time when the timer (T1) 5a generates an interruption signal during the time of the off-energy state. In this way, values stored in the energy rise counter 3p and energy fall counter 3q represent energy and off-energy time periods, respectively.

The energy rise counter 3p value (Ce-on) is checked each time when the state of the busy tone signal changes from energy to off-energy so as to read an immediately previous energy time period. If the energy rise counter 3p value Ce-on is within the corresponding effective time period, the energy periodic counter 3m is incremented, and if not, the energy periodic counter 3m is reset to 0. In a similar way, the energy fall counter 3q value is checked each time when the state of the busy tone signal changes from off-energy to energy so as to read an immediately previous off-energy time period. If the energy fall counter 3q value Ce-off is within the corresponding effective time period, the energy periodic counter 3m is incremented, and if not, the energy periodic counter 3m is reset to 0.

In the above-described way, the facsimile apparatus 100 performs the energy detection process so as to execute a voice message recording operation during the automatic answering and recording operation mode in a time-efficient manner, avoiding an event of recording a noisy tone after a calling apparatus disconnects the telephone line.

Figure 10A:
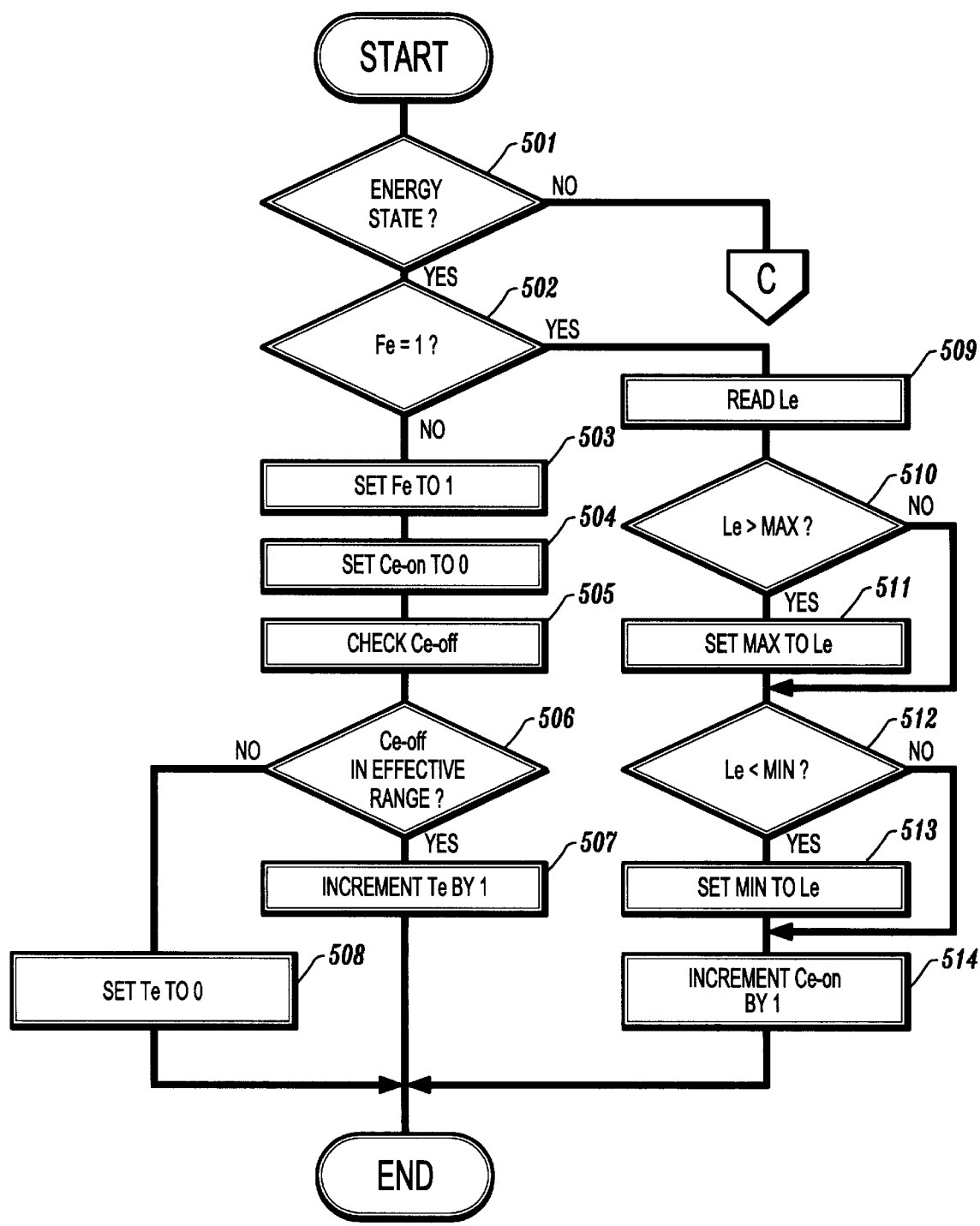
FIGS. 10(a) and 10(b) is a flowchart for explaining another exemplary energy detection process.

Next, an alternative operation of the energy detection process is explained with reference to FIGS. 10(a) and 10(b). The alternative operation of the energy detection process is similar to that of FIGS. 9(a) and 9(b), except for certain steps. The following description mainly focuses on unique points of the alternative operation. Upon determining in Step S501 that the incoming busy tone signal is in an energy state, the system controller 1 then determines as to whether the energy flag 3m value Fe is 1, in Step S502.

If in Step S502 the energy flag 3m value Fe is not set at 1 but at 0, the succeeding operations through Steps S503–S508 are similar to those through Steps S403–S408 of FIG. 9(a). However, when the energy flag 3m value Fe is set at 1, the succeeding operations through Steps S509–S514 are different from those through Step S409 of FIG. 9(a).

Upon determining in Step S502 that the energy flag 3m value is set at 1, the system controller 1 reads an energy level of the busy tone signal in Step S509. More specifically, the system controller 1 reads the AGC unit 11c having a gain which corresponds to an incoming busy tone signal in an energy state and, by comparing the gain set at the AGC 11c to the cross reference table stored in the gain cross reference 2d, reads a corresponding value from the cross reference table. The read value is referred to as an energy level of a busy tone signal and is stored in the energy level 3r. Of course, it may alternatively be possible to measure the energy level Le using a tool other than the AGC unit 11c.

After storing the energy level value into the energy level 3r in Step S509, the system controller 1 determines as to whether the energy level 3r value Le is greater than the variant (MAX) 3s in Step S510. The variant (MAX) 3s is set to 0 when the energy detection process is activated. If the energy level (Le) 3r is greater than the variant (MAX) 3s, the system controller 1 sets the variant (MAX) 3s to a value of the energy level value Le in Step S511. However, if not, the process jumps to Step S512 and the system controller 1 determines that the energy level value Le is smaller than the variant (MIN) 3t. The variant (MIN) 3t is set to a value of potential maximum energy level when the energy detection process is activated. If the energy level value Le is smaller than the variant (MIN) 3t, the system controller 1 sets the variant (MIN) 3t to a value of the energy level 3r in Step S513. However, if not, the process jumps to Step S514, where the system controller 1 increments the energy rise counter 3p value Ce-on by one, and the energy detection process ends.

Figure 10B:
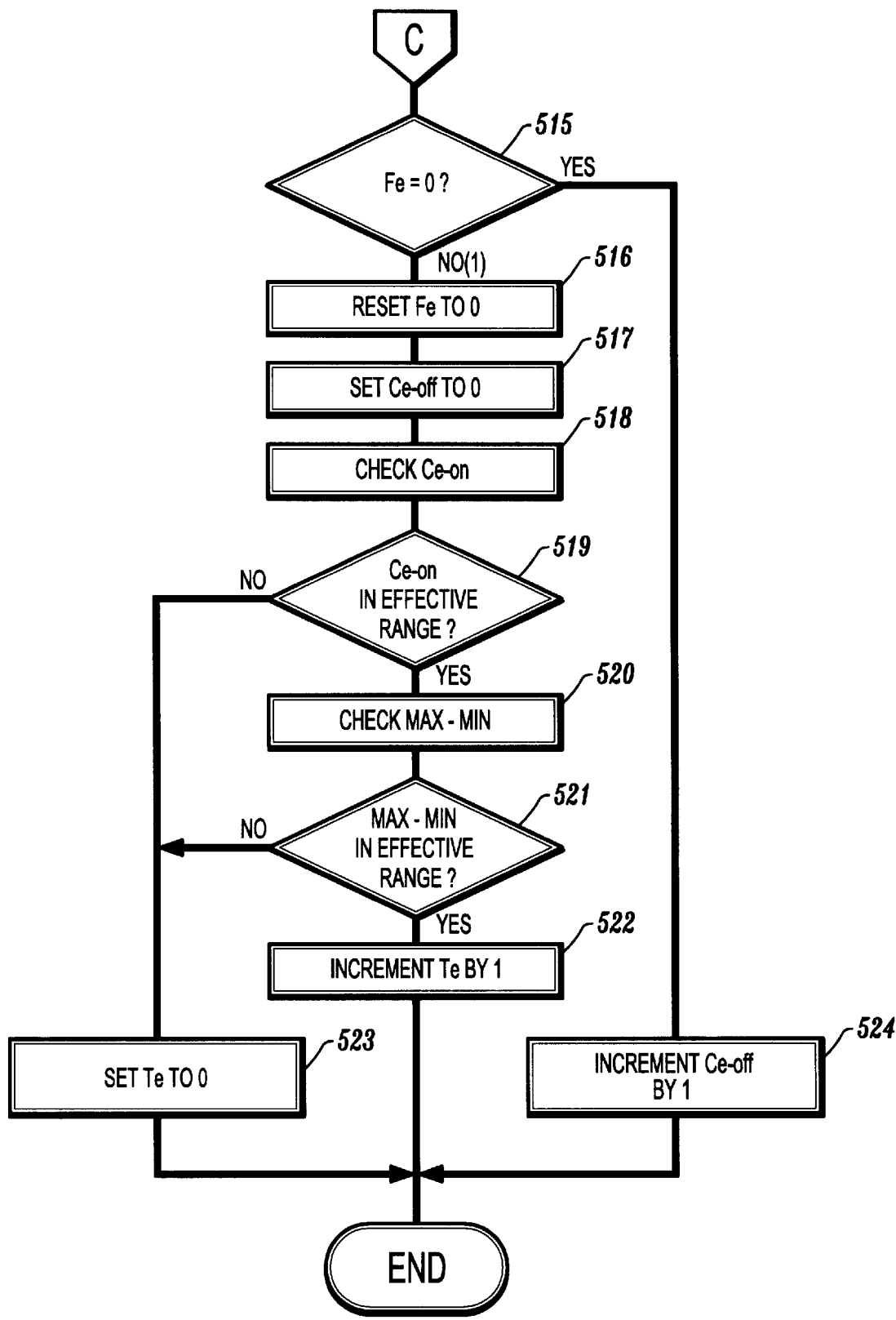

When the incoming busy tone signal is not in an energy state and the determination result of Step S501 is NO, operations proceed through Steps S515–S524 of FIG. 10(b). In the operations of FIG. 10(b), Steps 520 and 521 are added to a place between Steps S414 and 415 of FIG. 9(b).

If in Step S519 the value Ce-on of the energy rise counter 3p is determined to be within the default range of the energy time period, the system controller 1 performs a calculation of MAX–MIN in Step S520. The calculation of MAX–MIN indicates a difference of busy tone signal level in an energy state. Then, system controller 1 determines as to whether the calculation result of MAX–MIN is within a predetermined range. If the calculation result of MAX–MIN is within a predetermined range, the system controller 1 increments the energy periodic counter 3m in Step S522, and the energy detection process ends. If the calculation result of MAX–MIN is not within a predetermined range, the process proceeds to Step S523 and the system controller 1 resets the energy periodic counter 3m value Te to 0, and the energy detection process ends.

By the above described operations, the energy periodic counter 3m value Te is continuously incremented when a busy tone signal has periodic energy and off-energy states within the respective effective time period ranges and a difference of signal level in a periodic energy state is within a predetermined signal level range and is reset when at least one of the periodic energy and off-energy states of the busy tone signal is detected as being out of the corresponding effective time period range or a difference of signal level in a periodic energy state is detected as being out of a predetermined signal level range.

In this way, the facsimile apparatus 100 correctly detects a busy tone signal that has periodic energy and off-energy states and varies within a predetermines signal level range when the signal is in an energy state, so as to avoid an event of wrongly disconnecting the telephone line by a false detection of an incoming signal which is not a busy tone signal and may be a voice signal.

Figure 11A:
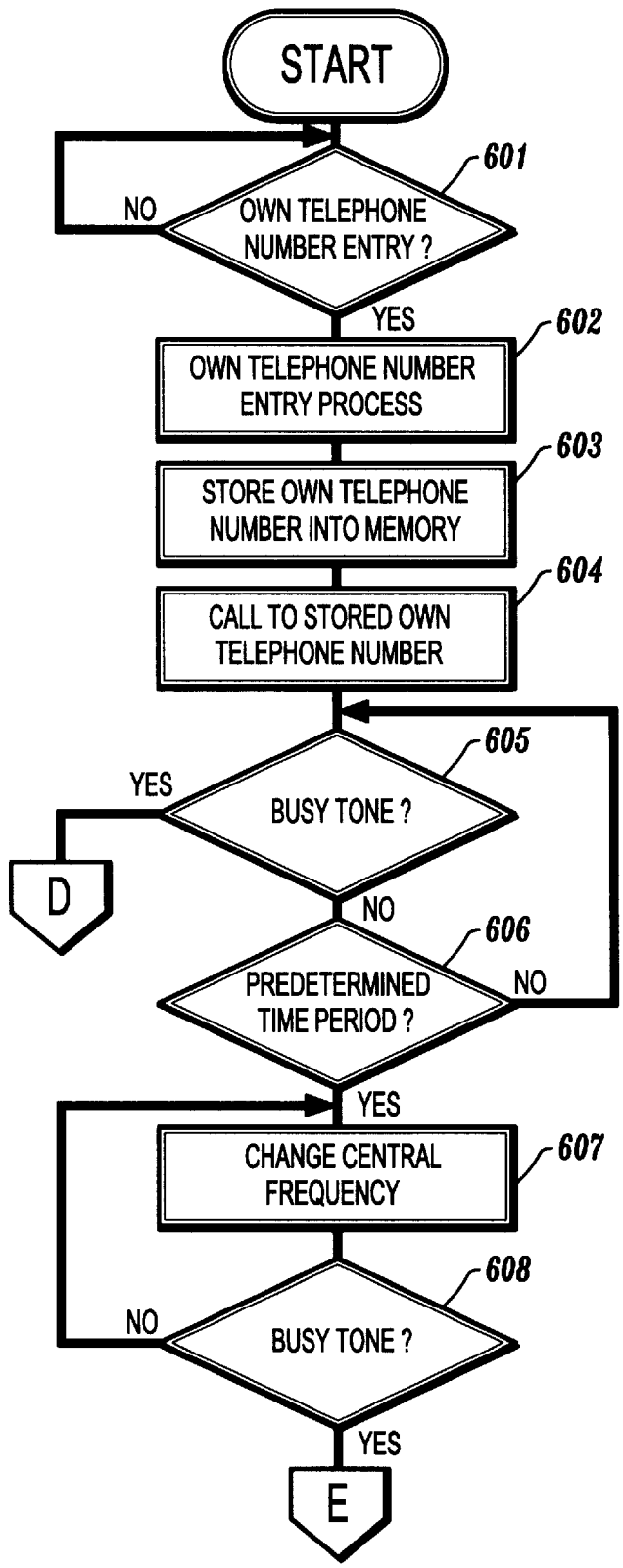
FIGS. 11(a) and 11(b) is a flowchart for explaining an exemplary automatic adjustment of busy tone detection parameters.

Next, an operation of adjusting a busy tone detecting parameter by the facsimile apparatus 100 is explained with reference to FIGS. 11(a)–12. In Step S 601 of FIG. 11(a), the system controller 1 checks if an instruction of an own telephone number entry is entered. If an own telephone number entry is not entered a NO loop is formed with Step S601 and the system controller 1 keeps checking an instruction for own telephone number entry. When the own telephone number entry is instructed, the own telephone number entry is performed in Step S602. During the operation of the own telephone number entry in Step S602, the system controller 1 receives an own telephone number, which is entered, for example, through the ten-key pad provided to the operational display unit 8. Then, the system controller 1 stores the own telephone number into the own telephone number 3a of the RAM 3 in Step S603 and instructs the network controller 12 to initiate a call to the stored own telephone number in Step S604 so as to receive a busy tone signal from the telephone switching system, e.g., a private branch exchange (PBX).

Then, the system controller 1 examines an output of the tone detecting filter 11b to determine if a busy tone signal is transmitted within a predetermined time period through a NO loop formed by Steps S605 and S606. The tone detecting filter 11b is previously set to the default values of filtering characteristic parameters stored in the default parameter 2a so as to have the characteristics of band-pass filter having a gain around the central frequency f(c) of, for example 400 Hz, as seen in FIG. 6. When the tone detecting filter 11b detects a busy tone signal and the determination result of in Step S605 is YES, the system controller 1 determines that the tone detecting filter 11b, having the default values of filtering characteristic parameters stored in the default parameter 2a, properly detects a busy tone signal. Then, the process of correcting busy tone detecting parameters ends.

When the tone detecting filter 11b detects no busy tone signal and the predetermined time period passes in Step S606, the result of Step S606 becomes YES and the process proceeds to Step S607. In step S607, the system controller 1 instructs the tone detecting filter 11b to change the central frequency fc, for example, among various values of filtering characteristic parameters, and checks if the tone detecting filter 11b having a changed central frequency detects a busy tone signal in Step S608. Each time when the check result of Step S608 is NO, the tone detecting filter 11b changes the central frequency from f(1) through to f(n), illustrated in FIG. 12, until succeeding in detecting a busy tone signal.

Figure 11B:
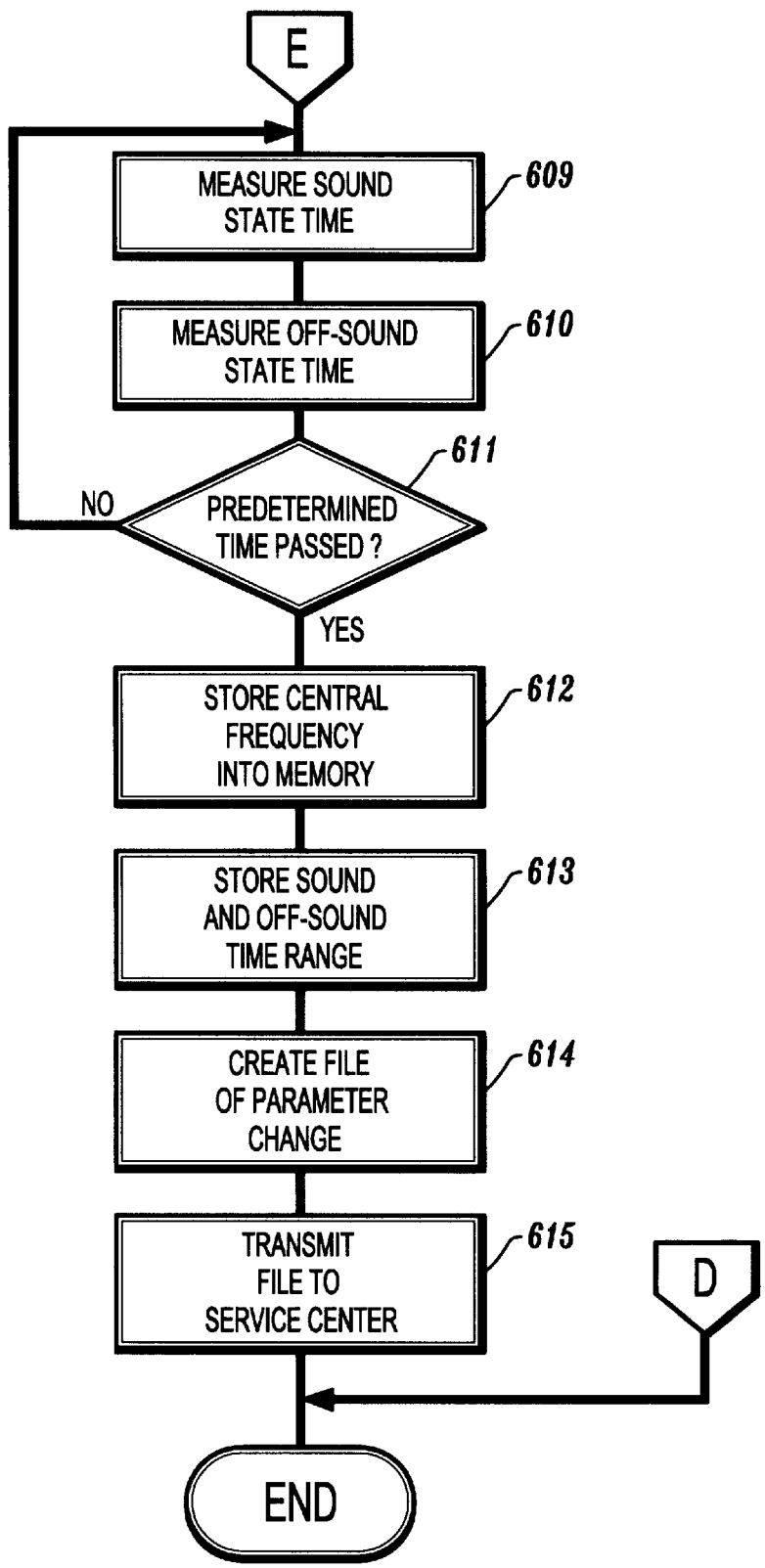
Figure 12:
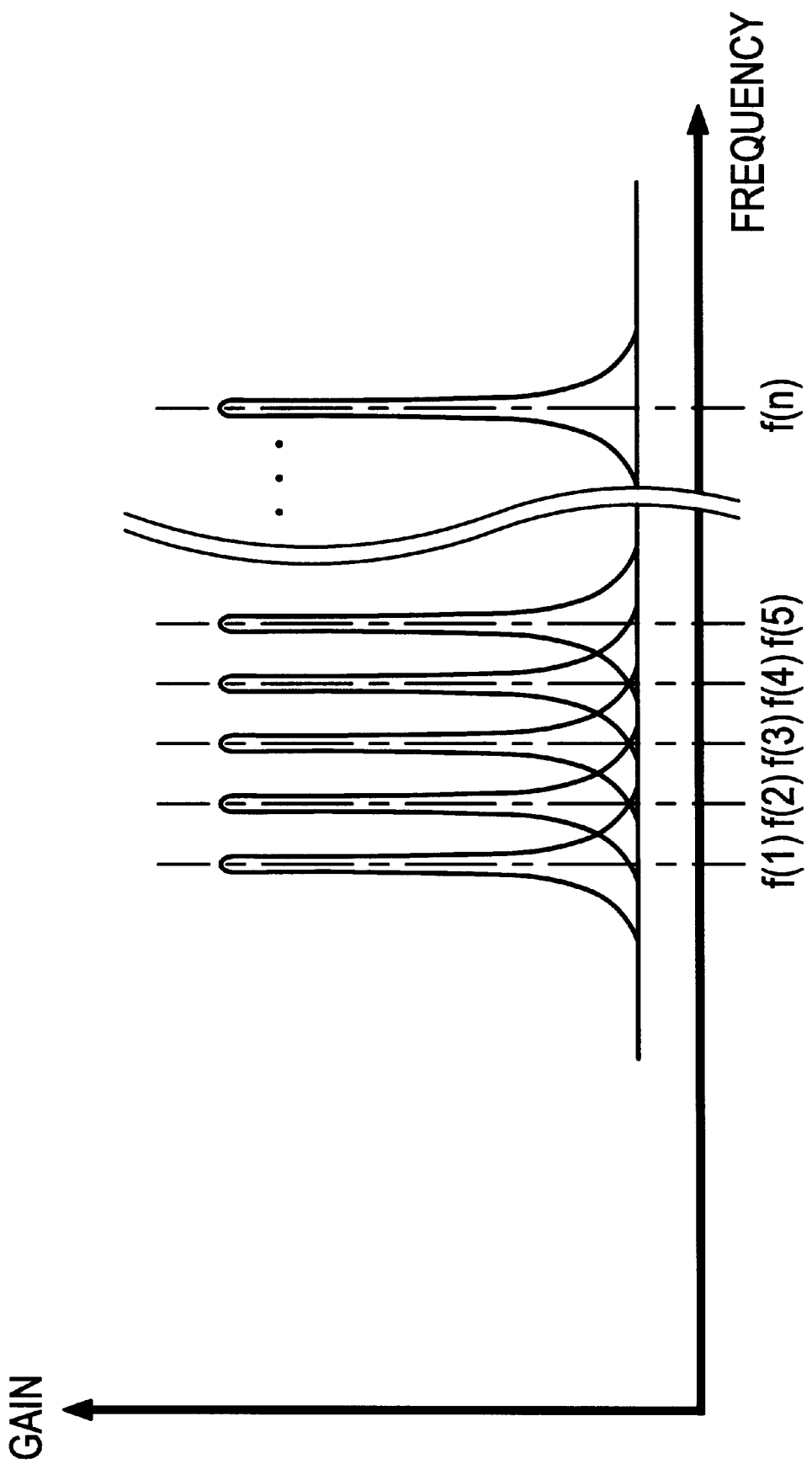
FIG. 12 is a graph illustrating a plurality of relationships of gain and varied frequencies used for the automatic adjustment of busy tone detection parameters.
Figure 13:
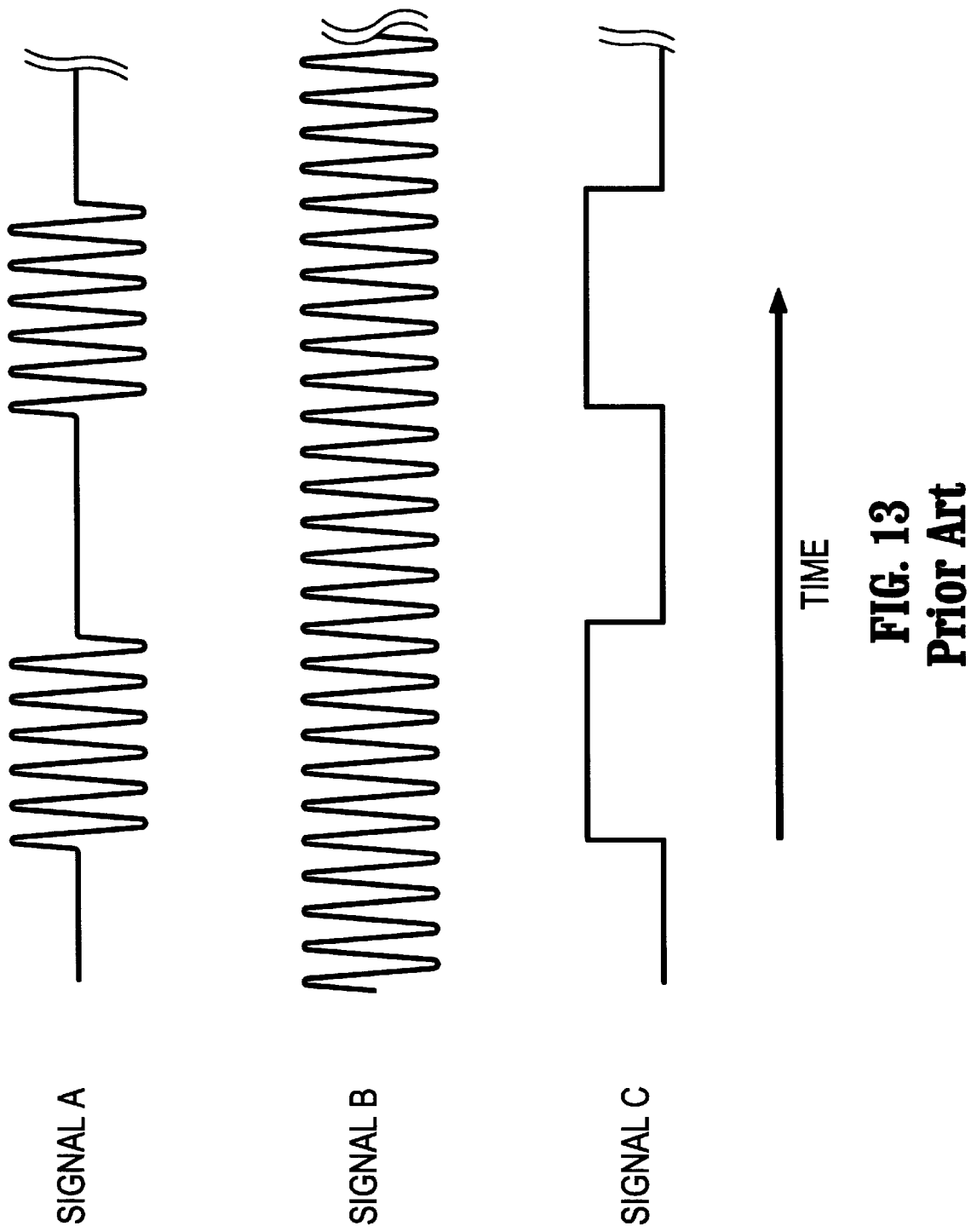
FIG. 13 illustrates a plurality of signals for explaining how a busy tone signal is made.

When the tone detecting filter 11b detects a busy tone signal in Step S608 and the check result of Step S608 is YES, the process proceeds to Step S609 of FIG. 11(b). Then, the system controller 1 checks an output from the tone detecting filter 11b so as to measure tone and off-tone state time periods of the busy tone signal in Steps S609 and S610, respectively. The measurements are made for a predetermined number of times which is counted by the system controller 1 and represented by the NO loop of Step S611. When completing the predetermined number of times measurements are made and the check result of Step S611 is YES, the system controller 1 stores a value of the central frequency with which the busy tone signal is detected into the central frequency 3c in Step S612. At this time, various parameters other than the central frequency stored in the current parameter 3b copy values from the filtering characteristic parameters stored in the default parameter 2a. Then, in Step S613, the system controller 1 stores values of the measured tone and off-tone state time periods of the busy tone signal into the current tone time range 3d and the current off-tone time range 3e, respectively.

In Step S614, the system controller 1 arranges to create a file in which all the changed parameters associated with the busy tone signal detecting operation are indicated, and converts the file into facsimile image information. Then, the system controller 1 instructs the network controller 12 to initiate a call to a service center for the facsimile apparatus so as to transmit the created facsimile image information including the above-mentioned all the changed parameters. By using the information, the service center for the facsimile apparatus may perform by manually an adjustment of busy tone signal detection of other facsimile apparatuses that have no such a function which automatically adjusts a busy tone signal detection.

After completing the above operations, the facsimile apparatus 100 can activate the busy tone detection process using various characteristic parameters 3b including the central frequency stored in the central frequency 3c, the tone and off-tone state time periods stored in the current tone time range 3d and in the current off-tone time range 3e, respectively. Thereby, the facsimile apparatus 100 is capable of appropriately detecting a different busy tone signal.

In this way, the facsimile apparatus 100 performs an operation of adjusting a busy tone detecting parameter in accordance with a different busy tone signal.

Although an embodiment of the application is a facsimile apparatus, as described above, it is to be understood that another embodiment of the application may be telephone equipment having an automatic answering and recording function and personal computers having a communications function.

This application may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The present application may also be implemented by the preparation of application specific integrated circuits or by interconnecting an appropriate network of conventional component circuits, as will be readily apparent to those skilled in the art.

Numerous additional modifications and variations of the present application are possible in light of the above teachings. It is therefore to be understood that within the scope of the appended claims, the present application may be practiced otherwise than as specifically described herein.

What we claim is:

1. A communications terminal apparatus, comprising:
   a data transmitter and receiver;
   memory for storing first and second reference time ranges;
   a tone detecting filter for detecting a signal tone on a telephone line;
   an energy detecting filter for detecting an energy on the telephone line;
   a first timer for measuring a tone state time period of a signal on the telephone line;
   a second timer for measuring an off-tone state time period of said signal; and
   a busy tone detector for determining whether said measured tone and off-tone state time periods of said signal are within said first and second reference time ranges, respectively, and whether said signal alternately includes said measured tone and off-tone time periods, and for determining that said signal includes a busy tone when said measured tone and off-tone state time periods of said signal are within said first and second reference time ranges, respectively, and when said signal alternately includes said measured tone and off-tone time periods, wherein the busy tone detector is capable of determining a busy tone using an output of the tone detecting filter and the energy detecting filter, the busy tone being determined when a busy tone is detected from the output of the tone detecting filter or the energy tone detecting filter.

2. The communications terminal apparatus according to claim 1, wherein said communications terminal apparatus is a facsimile apparatus.

3. The communications terminal apparatus according to claim 1, wherein said communications terminal apparatus is telephone equipment having an automatic and recording function.

4. The communications terminal apparatus according to claim 1, wherein said communications terminal apparatus is a personal computer.

5. A communications terminal apparatus, comprising:

a data transmitter and receiver;

a memory for storing first and second reference time ranges and a variation range;

a tone detecting filter for detecting a signal tone on a telephone line;

an energy detecting filter for detecting an energy on the telephone line;

a first timer for measuring a tone state time period of a signal on the telephone line;

a second timer for measuring an off-tone state time period of said signal;

a variation detector for measuring variations in signal level among a plurality of said tone time periods of said signal; and a busy tone detector for determining whether said measured tone and off-tone state time periods of said signal are within said first and second reference time ranges, respectively, whether said signal alternately includes said measured tone and off-tone time periods, and whether said measured variations are within said variation range, and for determining that said signal includes a busy tone when said measured tone and off-tone state time periods of said signal are within said first and second reference time ranges, respectively, when said signal alternately includes said measured tone and off-tone time periods and when said measured variations are within said variation range, wherein the busy tone detector is capable of determining a busy tone using an output of the tone detecting filter and the energy detecting filter, the busy tone being determined when a busy tone is detected from the output of the tone detecting filter or the energy tone detecting filter.

6. A communications terminal apparatus, comprising:

a data transmitter and receiver;

memory for storing first and second reference time ranges and a plurality of busy tone detecting parameters;

a tone detecting filter for detecting a signal tone on a telephone line;

an energy detecting filter for detecting an energy on the telephone line;

a first timer for measuring a tone state time period of a signal on the telephone line;

a second timer for measuring an off-tone state time period of said signal; and a busy tone detector for determining whether said signal is in accordance with said plurality of busy tone detecting parameters to determine that said signal includes a busy tone when said signal is in accordance with said plurality of busy tone detecting parameters, and wherein said busy tone detector determines whether said measured tone and off-tone state time periods of said signal are within said first and second reference time ranges, respectively and whether said signal alternately includes said measured tone and off-tone time periods, and wherein said busy tone detector determines that said signal includes a busy tone when said measured tone and off-tone state time periods of said signal are within said first and second reference time ranges, respectively, when said signal alternately includes said measured tone and off-tone time periods, and when said signal is not in accordance with said plurality of busy tone detecting parameters, wherein the busy tone detector is capable of determining a busy tone using an output of the tone detecting filter and the energy detecting filter, the busy tone being determined when a busy tone is detected from the output of the tone detecting filter or the energy tone detecting filter.

7. A communications terminal apparatus, comprising:

a data transmitter and receiver;

memory for storing first and second reference time ranges, a variation range and a plurality of busy tone detecting parameters;

a tone detecting filter for detecting a signal tone on a telephone line;

an energy detecting filter for detecting an energy on the telephone line;

a first timer for measuring a tone state time period of a signal on the telephone line;

a second timer for measuring an off-tone state time period of said signal;

a variation detector for measuring variations in signal level among a plurality of said tone time periods of said signal; and a busy tone detector for determining whether said signal is in accordance with said plurality of busy tone detecting parameters to determine that said signal includes a busy tone when said signal is in accordance with said plurality of busy tone detecting parameters, and wherein said busy tone detector determines whether said measured tone and off-tone state time periods of said signal are within said first and second reference time ranges, respectively, whether said signal alternately includes said measured tone and off-tone time periods, and whether said measured variations are within said variation range, and wherein said busy tone detector determines that said signal includes a busy tone when said measured tone and off-tone state time periods of said signal are within said first and second reference time ranges, respectively, when said signal alternately includes said measured tone and off-tone time periods, when said measured variations are within said variation range, and when said signal is not in accordance with said plurality of busy tone detecting parameters, wherein the busy tone detector is capable of determining a busy tone using an output of the tone detecting filter and the energy detecting filter, the busy tone being determined when a busy tone is detected from the output of the tone detecting filter or the energy tone detecting filter.

8. A communications terminal apparatus, comprising:

a data transmitter and receiver;

memory that stores a plurality of sets of busy tone detecting parameters, a default set of busy tone detecting parameters, a current set of busy tone detecting parameters, and an own telephone number;

a number register that registers an own telephone number for said communications terminal apparatus into said memory;

a busy tone generator that initiates a call to said number stored in said memory when said own telephone number is registered by said number register, so as to cause a telephone switching system coupled to said communications terminal apparatus to return a signal having a busy tone to said communications terminal apparatus;

a busy tone detector that detects a busy tone by determining whether said signal is in accordance with said default set of busy tone detecting parameters, and that determines that said signal has a busy tone when said signal is in accordance with said default set of busy tone detecting parameters; and a busy tone detecting parameter controller that changes in turn a set of busy tone detecting parameters among said plurality of sets of busy tone detecting parameters until said busy tone detector detects a busy tone when said busy tone generator calls said own telephone number stored in said memory and no busy tone is detected with said default set of busy tone detecting parameters, for storing a set of busy tone detecting parameters as a current set of busy tone detecting parameters into said memory when a busy tone is detected with said set of busy tone detecting parameters, and for instructing said busy tone detector to use said current set of busy tone detecting parameters.

9. The communications terminal apparatus according to claim 8, further comprising a parameter change notifier that initiates a call to a predetermined telephone number to notify changed contents of said current set of busy tone detecting parameters.

* * * * *